United States Patent
Hata et al.

(10) Patent No.: US 10,011,490 B2
(45) Date of Patent: Jul. 3, 2018

(54) CNT DISPERSION SOLUTION, CNT COMPACT, CNT COMPOSITION, CNT AGGREGATE, AND METHOD OF PRODUCING EACH

(71) Applicant: National Institute of Advanced Industrial Science and Technology, Chiyoda-ku, Tokyo (JP)

(72) Inventors: Kenji Hata, Tsukuba (JP); Kazufumi Kobashi, Tsukuba (JP); Don N. Futaba, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 428 days.

(21) Appl. No.: 13/886,591

(22) Filed: May 3, 2013

(65) Prior Publication Data
US 2013/0316160 A1 Nov. 28, 2013

Related U.S. Application Data

(63) Continuation of application No. PCT/JP2011/075511, filed on Nov. 4, 2011.

(30) Foreign Application Priority Data

Nov. 5, 2010 (JP) ................... 2010-249140

(51) Int. Cl.
*H01B 1/04* (2006.01)
*B82Y 30/00* (2011.01)
(Continued)

(52) U.S. Cl.
CPC .......... *C01B 31/0253* (2013.01); *B82Y 30/00* (2013.01); *B82Y 40/00* (2013.01);
(Continued)

(58) Field of Classification Search
CPC . H01B 1/04; H01B 1/24; B82Y 30/00; B82Y 40/00
(Continued)

(56) References Cited

U.S. PATENT DOCUMENTS

| | | | |
|---|---|---|---|
| 6,641,793 B2 | 11/2003 | Haddon | |
| 2005/0127030 A1* | 6/2005 | Watanabe et al. | 216/41 |

(Continued)

FOREIGN PATENT DOCUMENTS

| | | |
|---|---|---|
| CN | 1961102 A | 5/2007 |
| CN | 101365649 A | 2/2009 |

(Continued)

OTHER PUBLICATIONS

Gou et al. ("Experimental Design and Optimization of Dispersion Process for Single-Walled Carbon Nanotube Bucky Paper." Int Jour of Nanosc, 3(3), pp. 293-307, 2004).*

(Continued)

*Primary Examiner* — Tri V Nguyen
(74) *Attorney, Agent, or Firm* — Hauptman Ham, LLP

(57) ABSTRACT

A CNT dispersion liquid of the preset invention includes a CNT agglomerate arranged with a mesh body formed from a plurality of CNTs, the CNT agglomerate being dispersed in a dispersion medium is provided wherein a CNT agglomerate is obtained by extracting from the dispersion liquid and drying the CNT agglomerate the obtained CNT agglomerate has a pore size of 0.02 μm or more and 2.0 μm or less being maximized a differential pore volume in a pore size range of 0.002 μm or more and 10.00 μm or less measured using a mercury intrusion porosimeter.

10 Claims, 21 Drawing Sheets

(51) Int. Cl.
  *C01B 31/02* (2006.01)
  *C04B 35/528* (2006.01)
  *C04B 35/626* (2006.01)
  *B82Y 40/00* (2011.01)
  *C01B 32/174* (2017.01)
  *C08K 3/04* (2006.01)

(52) U.S. Cl.
  CPC .......... *C01B 32/174* (2017.08); *C04B 35/528* (2013.01); *C04B 35/6263* (2013.01); *C04B 35/6264* (2013.01); *C08K 3/041* (2017.05); *C01B 2202/28* (2013.01); *C01P 2006/10* (2013.01); *C01P 2006/16* (2013.01); *C04B 2235/5288* (2013.01); *C04B 2235/5427* (2013.01); *C04B 2235/5436* (2013.01); *C04B 2235/5463* (2013.01); *C08K 2201/011* (2013.01)

(58) Field of Classification Search
  USPC .......................... 252/500–511; 977/780, 842
  See application file for complete search history.

(56) References Cited

U.S. PATENT DOCUMENTS

| | | | |
|---|---|---|---|
| 2005/0224764 A1* | 10/2005 | Ma et al. .................... | 252/500 |
| 2009/0121606 A1 | 5/2009 | Okubo et al. | |
| 2009/0121613 A1 | 5/2009 | Taki | |
| 2009/0134363 A1 | 5/2009 | Bordere | |
| 2009/0286675 A1* | 11/2009 | Wei et al. .................... | 502/184 |
| 2009/0326278 A1 | 12/2009 | Balaban et al. | |
| 2010/0301278 A1 | 12/2010 | Hirai | |
| 2010/0330358 A1 | 12/2010 | Hashimoto | |
| 2011/0124790 A1 | 5/2011 | Penicaud | |
| 2011/0127472 A1 | 6/2011 | Sato | |
| 2011/0171364 A1* | 7/2011 | Xing et al. .................... | 427/77 |
| 2011/0204300 A1 | 8/2011 | Kitano | |
| 2011/0250451 A1* | 10/2011 | Heintz et al. ................ | 428/401 |
| 2013/0261246 A1 | 10/2013 | Ong et al. | |

FOREIGN PATENT DOCUMENTS

| | | |
|---|---|---|
| CN | 101374762 A | 2/2009 |
| CN | 101663714 A | 3/2010 |
| CN | 101873994 A | 10/2010 |
| EP | 1787955 A1 | 5/2007 |
| EP | 2 151 415 A1 | 2/2010 |
| EP | 2 154 108 A1 | 2/2010 |
| EP | 2 361 880 A1 | 8/2011 |
| JP | 2005-213108 A | 8/2005 |
| JP | 2005-530667 A | 10/2005 |
| JP | 2006-265178 A | 10/2006 |
| JP | 2007-055863 A | 3/2007 |
| JP | 2007-115495 A | 5/2007 |
| JP | 2007-169120 A | 7/2007 |
| JP | 2007-517760 A | 7/2007 |
| JP | 2007-534588 A | 11/2007 |
| JP | 2008-201626 A | 9/2008 |
| JP | 2009-506970 A | 2/2009 |
| JP | 2009-149832 A | 7/2009 |
| JP | 2010-001475 A | 1/2010 |
| JP | 2010-13312 A | 1/2010 |
| JP | 5608954 B2 | 10/2014 |
| JP | 5896491 B2 | 3/2016 |
| JP | 6082913 B2 | 2/2017 |
| WO | 03/060941 A2 | 7/2003 |
| WO | 2005069765 A2 | 8/2005 |
| WO | 2006/073420 A | 7/2006 |
| WO | 2006073420 A2 | 7/2006 |
| WO | 2009/101271 A2 | 8/2009 |
| WO | 2009098779 A1 | 8/2009 |
| WO | 2009102077 A1 | 8/2009 |
| WO | 2010/047365 A1 | 4/2010 |

OTHER PUBLICATIONS

Pegel et al. ("Dispersion, agglomeration, and network formation of multiwalled carbon nanotubes in polycarbonate melts." Polymer, 49, pp. 974-984, online Dec. 23, 2007).*
Yeh A study of nanostructure and properties of mixed nanotube buckypaper materials: Fabrication, process modeling characterization, and property modeling (Order No. 3301613). ProQuest Dissertations & Theses Global: Science & Technology. (304875315). (Year: 2007).*
Office Action issued by SIPO dated Aug. 21, 2014 of corresponding Chinese application No. 2011800534959.
English Translation of International Search Report dated Jan. 31, 2012 of corresponding PCT/JP2011/075511.
English Translation of International Preliminary Report on Patentability dated Jan. 31, 2012 of corresponding PCT/JP2011/075511.
International Search Report of PCT/JP2011/075511.
Office Action dated Mar. 3, 2015 regarding a counterpart Japanese patent application No. 2014-139652. With partial English translation.
Office Action dated Apr. 28, 2015 regarding a counterpart Japanese patent application No. 2014-165351. With partial English translation.
Japanese Office Action dated Feb. 7, 2017 for Japanese application No. 2016-091042.
The extended European Search Report dated Nov. 24, 2017 for the corresponding European application No. 11838104.5.

* cited by examiner

CNT DISPERSION SOLUTION, CNT COMPACT, CNT COMPOSITION, CNT AGGREGATE, AND METHOD OF PRODUCING EACH

CROSS REFERENCE TO RELATED APPLICATIONS

This application is based upon and claims the benefit of priority from the prior Japanese Patent Application No. 2010-249140, filed on Nov. 5, 2010 and PCT Application No. PCT/JP2011/075511, filed on Nov. 4, 2011, the entire contents of which are incorporated herein by reference.

FIELD

The present invention is related to a CNT dispersion in which carbon nanotubes (referred to below as CNT) are dispersed in a solution and a method of manufacturing the same.

BACKGROUND

A CNT formed from only carbon atoms is a material having excellent electrical properties, thermal conductivity and mechanical properties. A CNT is very light and extremely string and has excellent flexibility and restoring force. A CNT having these types of excellent properties is a very attractive and important material for industrial use.

A CNT is dispersed uniformly in a solution in the case where a CNT is used as an industrial material. For example, it is possible to manufacture nano-composite in which CNTs are dispersed uniformly in a polymer matrix by dissolving a polymer in a solution dispersed uniformly with the CNTs. In addition, when manufacturing electronic devices such as transistors, electron emission sources or secondary batteries, for example, a method exists whereby a suspension solution in which CNTs are dispersed in a solution is created, and after forming a suspension solution pattern on a support composite which is used as a substrate using a printing technology such as cast, screen or inkjet printing, the solution is dried, removed and a desired shape is obtained.

However, a method has still not been established for sufficiently dispersing nanotubes in a solution. This is because CNTs bundle together or clump into roping due to the Van der Waals force between mutual CNTs. Therefore, despite the unique and useful properties of CNTs, it is extremely difficult to manufacture a polymer type nano-composite dispersed uniformly with CNTs which makes actual application to various uses of CNTs difficult.

In order to disperse CNTs uniformly a method is disclosed in Japanese Laid Open Patent 2009-149832 of a processing a mixed product including 10 mg of a double-walled CNT agglomerate, 30 mg of sodium polystyrene sulfonate and 10 mL of water using an ultrasonic homogenizer and after centrifugal processing at 20000 G and when 9 mL of a supernatant is sampled, the CNT agglomerate in which the contained amount of the CNT agglomerate within the supernatant becomes 0.6 mg/mL or more is used as a material for a transparent conductive film. In this way, an ultrasonic process was performed conventionally well enough for dispersing CNTs yet there was a problem whereby the CNTs easily broke when exposed to ultrasonic waves.

In addition, a stable CNT dispersion is disclosed in Japanese Laid Open Patent 2007-169120 in which a single-walled CNT is not formed at all as a bundle or exists as a bundle comprised from a small amount of single-walled CNTs by using an aprotic organic dispersion medium and a wholly aromatic polyamide are used as an aggregation inhibitor. In these conventional technologies, a uniform CNT dispersion was obtained by either inhibiting or unwinding an aggregation of CNTs when manufacturing a CNT dispersion.

SUMMARY

A conventional dispersion method aimed to obtain a stable CNT dispersion by inhibiting or unwinding as much as possible an aggregation of CNTs and dispersing isolated CNTs in a dispersion medium. However, in this type of method, there was a problem whereby the CNTs either broke or were damaged when dispersed and as a result the inherent properties of the CNTs couldn't be sufficiently maintained. Reversely, when CNTs were dispersed so as to not suffer damage the amount of dispersion was insufficient causing the CNTs to aggregate and separate from the dispersion and thus a stable dispersion could not be obtained. Furthermore, there was a problem where CNTs could not be stably dispersed at a high concentration in a conventional dispersion.

The present invention attempts to solve the problems of the background technology described above by providing a CNT dispersion, a CNT compact, a CNT composition, a CNT agglomerate and method of producing each, the CNT dispersion being stable at a high concentration with very little damage to the CNTs, maintaining excellent electrical properties, thermal conduction and mechanical properties and a high level of dispersion.

According to one embodiment of the present invention, a CNT dispersion including a CNT agglomerate arranged with a mesh body formed from a plurality of CNTs, the CNT agglomerate being dispersed in a dispersion medium is provided wherein a CNT agglomerate is obtained by extracting from the dispersion and drying the CNT agglomerate the obtained CNT agglomerate has a pore size of 0.02 μm or more and 2.0 μm or less being maximized a differential pore volume in a pore size range of 0.002 μm or more and 10.00 μm or less measured using a mercury intrusion porosimeter.

A pore volume of the CNT agglomerate extracted from the dispersion at a pore size having a maximum differential pore volume is 0.5 mL/g or more.

A concentration of the CNT agglomerate dispersed in the dispersion medium is 0.001% by weight or more.

Viscosity of the CNT dispersion at a shear rate of 10/seconds is 10 mPa·s (25° C.) or more and 5000 mPa·s (25° C.) or less.

The CNT agglomerate and the dispersion medium do not separate even after being left for 10 days.

A 50% accumulation of a particle diameter measured in a range of 1 μm or more in a particle distribution of the CNT agglomerate of the CNT dispersion measured using laser diffraction is 10 μm or more and 1000 μm or less.

A reduction in weight from 200° C. to 400° C. in a thermal weight measurement when the temperature of the CNT agglomerate extracted from the dispersion is increased at 1° C. per minute is 10% or less.

The CNT agglomerate extracted from the dispersion has a specific surface area of 800 $m^2$/g or more and 2500 $m^2$/g or less.

An average distribution size of the CNT agglomerate extracted from the dispersion is 500 $\mu m^2$ or more and 50000 $\mu m^2$ or less.

In addition, according to one embodiment of the present invention, a CNT dispersion including a CNT agglomerate arranged with a mesh body formed from a plurality of CNTs, the CNT agglomerate being dispersed in a dispersion medium is provided wherein the CNT agglomerate is arranged with a connection part arranged with a mesh body and/or a trunk section formed from a plurality of orientated CNTs between the CNT agglomerates.

The CNT agglomerate is arranged with the trunk section formed from the plurality of orientated CNTs.

The CNT dispersion further includes the trunk section arranged in the CNT agglomerate and extending to the connection part.

An average distribution size of the CNT agglomerate is 500 μm² or more and 50000 μm² or less.

In addition, according to one embodiment of the present invention, a CNT compact is provided including the CNT agglomerate extracted from the CNT dispersion.

In addition, according to one embodiment of the present invention, a CNT compact is provided formed by coating the CNT dispersion on a substrate.

In addition, according to one embodiment of the present invention, a CNT compact is provided formed by coating a CNT agglomerate extracted from the CNT dispersion on a substrate.

In addition, according to one embodiment of the present invention, a CNT composition is provided including a CNT agglomerate extracted from the CNT dispersion.

In addition, according to one embodiment of the present invention, a CNT composition is provided including the CNT dispersion.

In addition, according to one embodiment of the present invention, a CNT agglomerate is provided including a pore size of 0.02 μm or more and 2.0 μm or less being maximized a differential pore volume in a pore size range of 0.002 m or more and 10.00 μm or less measured using a mercury intrusion porosimeter.

A pore volume of the CNT agglomerate at a pore size having a maximum differential pore volume is 0.5 mL/g or more.

A reduction in weight from 200° C. to 400° C. in a thermal weight measurement when the temperature of the CNT agglomerate is increased at 1° C. per minute is 10% or less.

The CNT agglomerate has a specific surface area of 600 m²/g or more and 2500 m²/g or less.

The CNT agglomerate has conductivity of 10 S/cm or more.

In addition, according to one embodiment of the present invention, a method of manufacturing a CNT dispersion is provided including preparing a CNT agglomerate, and mixing a dispersion medium with the CNT agglomerate after drying, applying a shear force, dispersing the CNT agglomerate and producing a dispersion including the CNT agglomerate arranged with a mesh body formed from a plurality of CNTs, wherein the CNT agglomerate is extracted from the dispersion, and the CNT agglomerate obtained after drying has a pore size of 0.02 m or more and 2.0 μm or less being maximized a differential pore volume in a pore size range of 0.002 μm or more and 10.00 μm or less measured using a mercury intrusion porosimeter.

In addition, according to one embodiment of the present invention, further includes drying the CNT agglomerate.

In addition, according to one embodiment of the present invention, further includes classifying the CNT agglomerate.

In addition, according to one embodiment of the present invention, a method of manufacturing a CNT compact is provided including preparing a CNT agglomerate, mixing a dispersion medium with the CNT agglomerate, applying a shear force, dispersing the CNT agglomerate and producing a dispersion including the CNT agglomerate arranged with a mesh body formed from a plurality of CNTs, and removing the dispersion medium from the dispersion medium containing the CNTs.

In addition, according to one embodiment of the present invention, a method of manufacturing a CNT compact is provided including preparing a CNT agglomerate, mixing a dispersion medium with the CNT agglomerate, applying a shear force, dispersing the CNT agglomerate and producing a dispersion including the CNT agglomerate arranged with a mesh body formed from a plurality of CNTs, and coating the CNT dispersion on a substrate.

In addition, according to one embodiment of the present invention, a method of manufacturing a CNT compact is provided including preparing a CNT agglomerate, mixing a dispersion medium with the CNT agglomerate, applying a shear force, dispersing the CNT agglomerate and producing a dispersion including the CNT agglomerate arranged with a mesh body formed from a plurality of CNTs, and extracting the CNT agglomerate from the CNT dispersion and coating on a substrate.

DESCRIPTION OF EMBODIMENTS

A CNT dispersion, a CNT compact, a CNT composition, a CNT agglomerate and method of producing each related to the present invention are explained below while referring to the diagrams. The CNT dispersion, CNT compact, CNT composition, CNT agglomerate and method of producing each of the present invention should not be interpreted as being limited to the contents described in the embodiment and examples shown below. Furthermore, in the diagrams referred to in the embodiments and examples, the same parts or parts having the same function are attached with the same reference symbols and thus repeated explanations of such parts are omitted.

(CNT Agglomerate Dispersion)

Conventional technological development has as much as possible progressed in the direction of dispersing a single CNT or in isolation. However, the present invention is based on a very different technological concept. That is, the manufacturing method of the dispersion related to the present invention does not disperse a single CNT or a CNT in isolation within a dispersion medium but disperses a CNT agglomerate within a dispersion medium stably and a high concentration. A conventional CNT agglomerate is generally a bundle or aggregate of CNTs having low dispersion properties and it was particularly difficult to stably disperse the CNT agglomerate within a dispersion medium in this type of form. As a result of repeating multiple experiments the inventors arrived at the present invention by stably dispersing a CNT agglomerate having unique properties and a unique structure within a dispersion medium. That is, the dispersion related to the embodiments of the present invention is not dispersed with a single CNT or CNT in isolation but is formed by dispersing a CNT agglomerate arranged with mesh body comprised from a plurality of CNTs into a dispersion medium.

Figure 1:
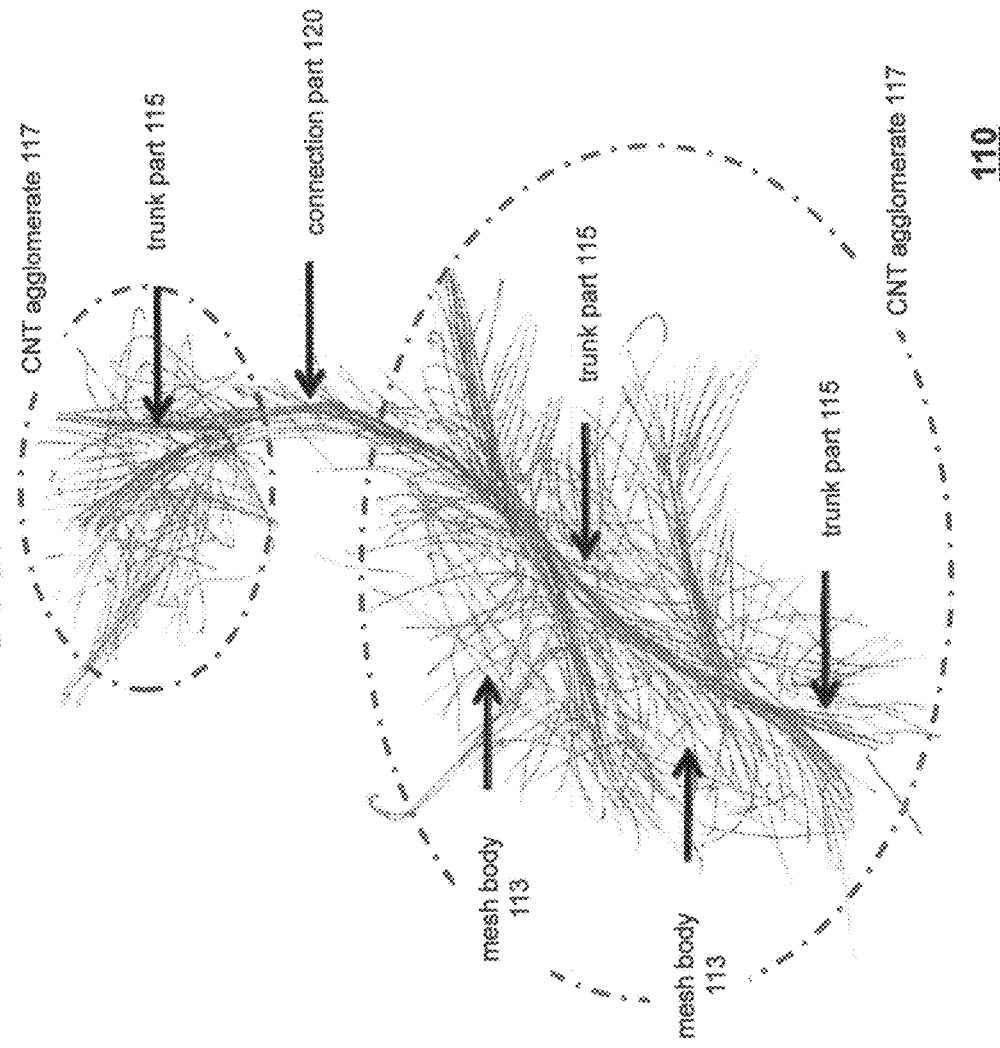
FIG. 1 is an exemplary diagram of a CNT group 110 related to one embodiment of the present invention.

FIG. 1 is an exemplary diagram of a CNT group 110 related to the embodiments of the present invention. The CNT group 110 is comprised from a mesh body 113, a trunk part 115, a connection part 120 arranged with the trunk part 115 and mesh body 113 and a plurality of CNT agglomerates arranged with the trunk part 115 extending to the connection part 120. Here, a mesh body indicates a network having a non-woven fabric structure of CNTs (or CNT bundle) and CNTs (or CNT bundle) having a fine pore (gaps) structure as shown in the scanning electron microscope image (SEM) shown in FIG. 2 and FIG. 3. A CNT agglomerate 117 including the mesh body 113 is appropriately unwound between CNTs (or between CNT bundles), and has excellent dispersion capabilities due to the existence of gaps in which a dispersion can easily impregnate between the CNTs (or between CNT bundles. Furthermore, CNTs (or CNT bundles) which form the mesh body 113 are preferred to be essentially non-orientated.

In addition, a dispersion 100 which is not comprised from a single CNT or CNT in isolation but includes the CNT agglomerate arranged with the mesh body 113 has the advantage sufficiently demonstrating the inherent properties of a CNT since the CNT agglomerate 117 is arranged with a highly developed network of CNTs which extends to small sections over a wide area. The CNT dispersion 100 related to the embodiment of the present invention may also include unbound CNTs and bundles of CNTs in a range where the effects of the present invention are not lost.

The CNT agglomerate 117 related to the embodiment of the present invention is preferred to have a pore diameter of in a range of 0.02 µm or more and preferably 0.03 µm or more and more preferably 0.04 µm or more and 2.0 µm or less and preferably 1.5 µm or less and even more preferably 1.0 µm or less and still more preferably 0.7 µm or less and yet more preferably 0.5 µm or less in which a differential pore volume in a pore diameter range of 0.002 µm or more and 10.00 µm or less is a maximum calculated using a mercury intrusion method. In addition, a pore volume at pore diameters where a differential pore volume is a maximum is preferred to be 0.5 mL/g or more and more preferably 0.6 mL/g or more and still more preferably 0.7 mL/g or more yet more preferably 0.8 mL/g or more. Although there is no particular upper limit to the pore volume, a pore volume of the CNT agglomerate 117 is generally 20 mL/g or less and more preferably 10 mL/g or less and still more preferably 5 mL/g or less. Because the CNT agglomerate 117 having this type of pore has several appropriate gaps (pores) between CNTs which form the mesh body 113, a dispersion can easily impregnate between CNTs and easily contact the surface of the CNTs. As a result, the mutual effects of the CNTs and dispersion medium increase and the CNTs easily fuse within a dispersion medium and as a result, the CNT agglomerate 117 including these types of pores is stably dispersed within the dispersion medium. Furthermore, a pore diameter in which a differential pore volume is a maximum in a pore diameter range of 0.002 µm or more and 10.00 µm or less is preferred to be one (a peak differential pore volume is one). Because the CNT agglomerate 117 including this differential pore volume has a uniform pore diameter it becomes easier to disperse within a dispersion medium.

The CNT agglomerate 117 related to the embodiment of the present invention has excellent dispersion properties compared to a conventional CNT agglomerate. However, since it is difficult to appropriately specify a CNT agglomerate within a dispersion medium, CNTs are extracted from the dispersion 100 including the CNT agglomerate 117 as a CNT compact 150, the CNT compact was evaluated and the properties of the CNT agglomerate 117 are stipulated using the method described below.

A publicly known means may be used as the method for extracting CNTs including the CNT agglomerate 117 from the CNT dispersion 100. For example, the CNT agglomerate 117 may be extracted from the CNT dispersion 100 using the following sequence. The dispersion 100 including the CNT agglomerate 117 including 100 g of CNTs is prepared. A Millipore filter (Filter Membrane: DURAPORE (Registered Trademark) (0.22 µm GV, diameter 45 mm) manufactured by MILLIPORE) is set into a container which can be vacuumed, and the CNT dispersion 100 is filtered using the Millipore filter. The CNT agglomerate 117 is deposited on the Millipore filter and a thin film CNT compact is formed with a thickness of around 70 µm. The CNTs deposited on the Millipore filter are sandwiched between two pieces of filter paper and vacuum dried at 70° C. for 12 hours. After drying, the thin film CNT compact is easily peeled from the Millipore filter and a desired sample is obtained. In the embodiment of the present invention, a differential pore volume, pore volume, specific surface area, purity and thermal weight etc are measured using this sample.

Viscosity of the CNT dispersion at a sheer rate of 10/sec related to the embodiment of the present invention is a value in a range of 10-5000 mPa·s (25° C.) and more preferably 20-2000 mPa·s (25° C.). Because the CNT dispersion 100 including this viscosity has mesh pairs of CNT agglomerates 117 which contact and entangle with each other, the CNT agglomerates 117 are stable within the dispersion medium and a stable CNT dispersion 100 is provided.

The lower limit of the concentration of CNTs within the dispersion 100 related to the embodiment of the present invention is 0.001% by weight or more with respect to the total CNT dispersion 100, or more preferably 0.002% by weight or more and still more preferably 0.005% by weight or more and yet more preferably 0.01% by weight or more. Obtaining a CNT dispersion having this type of high concentration is one feature of the present invention. Usually, it is difficult to stably disperse CNTs at a high concentration within a without using a dispersant. For example, in the case where CNTs are dispersed within MIBK using the manufacturing method of the present invention using an ultrasonic process, the CNTs and soon separate when the weight is 0.0006% by weight or more.

Although there is no particular upper limit to the concentration of CNTs within the CNT dispersion 100 related to the embodiment of the present invention, viscosity increases when the CNT concentration is large and compact processing becomes difficult. The concentration of CNTs within the CNT dispersion 100 is preferred to be 20% by weight or less with respect to the total CNT dispersion 100, or more preferably 15% by weight or less and still more preferably 10% by weight or less and yet more preferably 5% by weight or less. Because the CNT dispersion 100 including this level of CNT concentration has mesh CNT agglomerates 117 within the dispersion at a high concentration, it is inferred that the CNTs appropriately contact with each other within the dispersion and as a result the CNT agglomerates are stable within the dispersion medium and a stable CNT dispersion 100 is provided. Because a CNT dispersion with a high concentration significantly improves the manufacturing efficiency of a compact process, this is extremely desirable for CNT compact and composition manufacture.

A particle size distribution of the CNT agglomerate 117 related to the present invention is preferred to be evaluated using laser diffraction. A particle diameter (median diameter) of an accumulation of 50% of a particle size distribution of the obtained CNT agglomerate in a measurement region range of 1 µm or more is 10 µm or more and more preferably 15 µm or more and still more preferably 10 µm or less and 1000 µm or less and more preferably 750 µm or less. A CNT dispersion including this median diameter has excellent dispersion properties and is desirable since the inherent conduction properties of a CNT are maintained.

In the embodiment of the present invention, the size and structure of the CNT agglomerate 100 are stipulated according to the observation results of a sample prepared with method describe below. About 1 ml of the CNT dispersion 100 is prepared. A substrate (silicon in the case of a SEM observation and slide glass in the case of an optical microscope) coated with the sample is set on a vacuum pipe located at the center of the container shaped coat section. Above this, when the substrate is set on the vacuum pipe, about 0.1 ml of a is dripped to the center of the substrate and spin coating performed at rotation conditions of 3000 RPM× 30 seconds. In the case of a sample with a low viscosity, the sample is coated uniformly at 1000 RPM×30 seconds. In the case where there is a problem in the spreading of the CNT agglomerate 117 on the substrate, the number of rotations is changed and finely adjusted. In this way, a sample in which pairs of CNT agglomerates 117 do not overlap is prepared by coating on a very thing glass substrate etc using a known means such as spin coating the dispersion 100. The structure and shape of the CNT agglomerate 117 are measured using an appropriate observation means of the sample such as an optical microscope or electron microscope.

The lower limit of the distribution center size of the CNT agglomerate 117 related to the embodiment of the present invention is 500 $\mu m^2$ or more and more preferably 1000 $\mu m^2$ or more and still more preferably 2000 $\mu m^2$ or more. The upper limit is 50000 $\mu m^2$ or less or more preferably 30000 $\mu m^2$ or less. A CNT agglomerate 117 arranged with a distribution center size of this type of CNT agglomerate 117 has excellent dispersion properties and is desirable since the inherent conduction properties of a CNT are maintained.

The distribution center size of the CNT agglomerate 117 is measured by the following sequence. The surface of the sample coated so that CNT agglomerates 117 do not overlap on the substrate described above is observed at a magnification of 200 times and the surface of the CNT agglomerate 117 randomly extracted with a size of 10 µm or more is analyzed using a public domain image processing software (image J) and the size of the CNT agglomerate 117 is calculated by calculating a two dimensional surface area. The size of 100 CNT agglomerates 117 randomly extracted is calculated and the average value is given as the distribution center of the CNT agglomerate 117.

Figure 4:
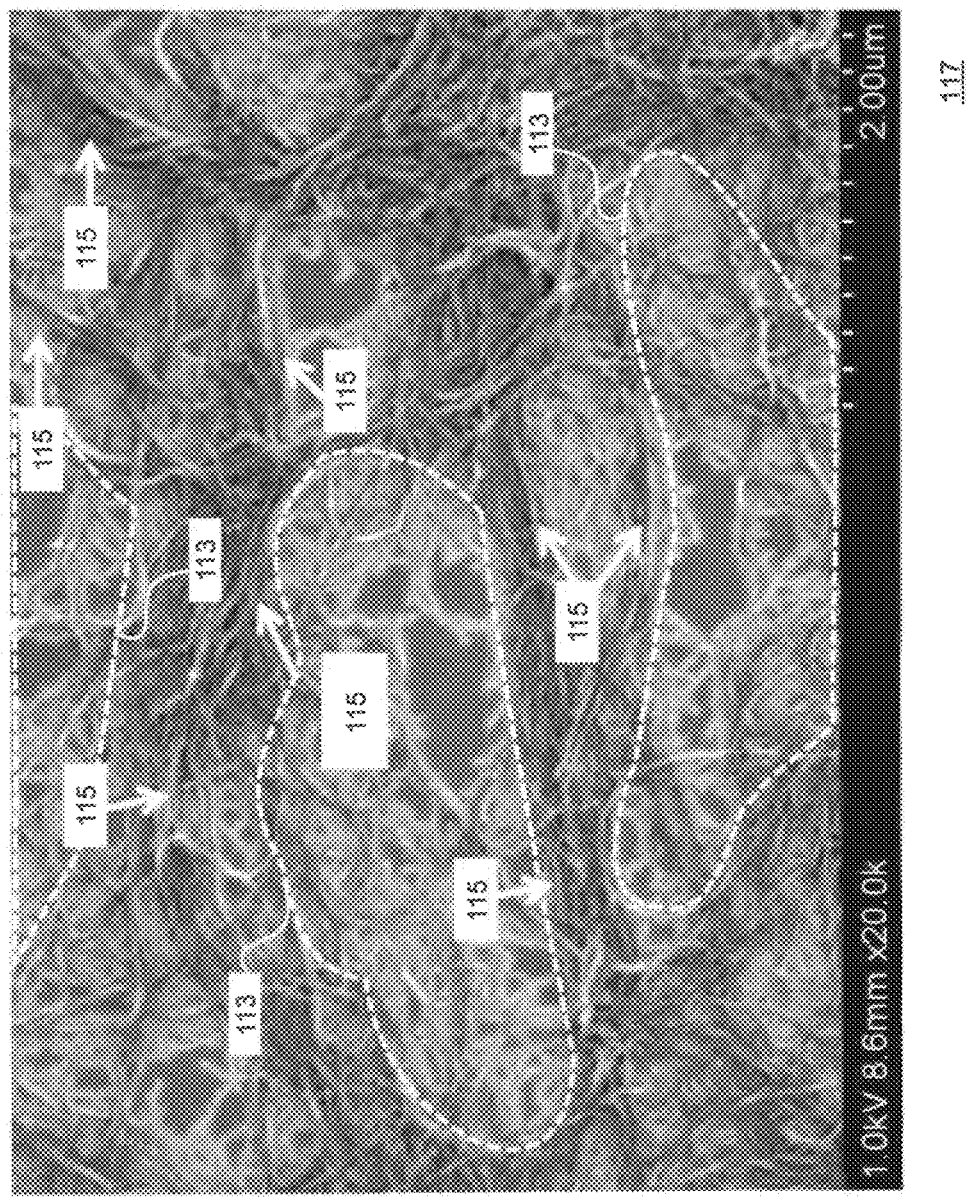
FIG. 4 is a SEM image of a CNT agglomerate 117 including the mesh body 113 and a trunk section 115 related to one embodiment of the present invention.
Figure 5:
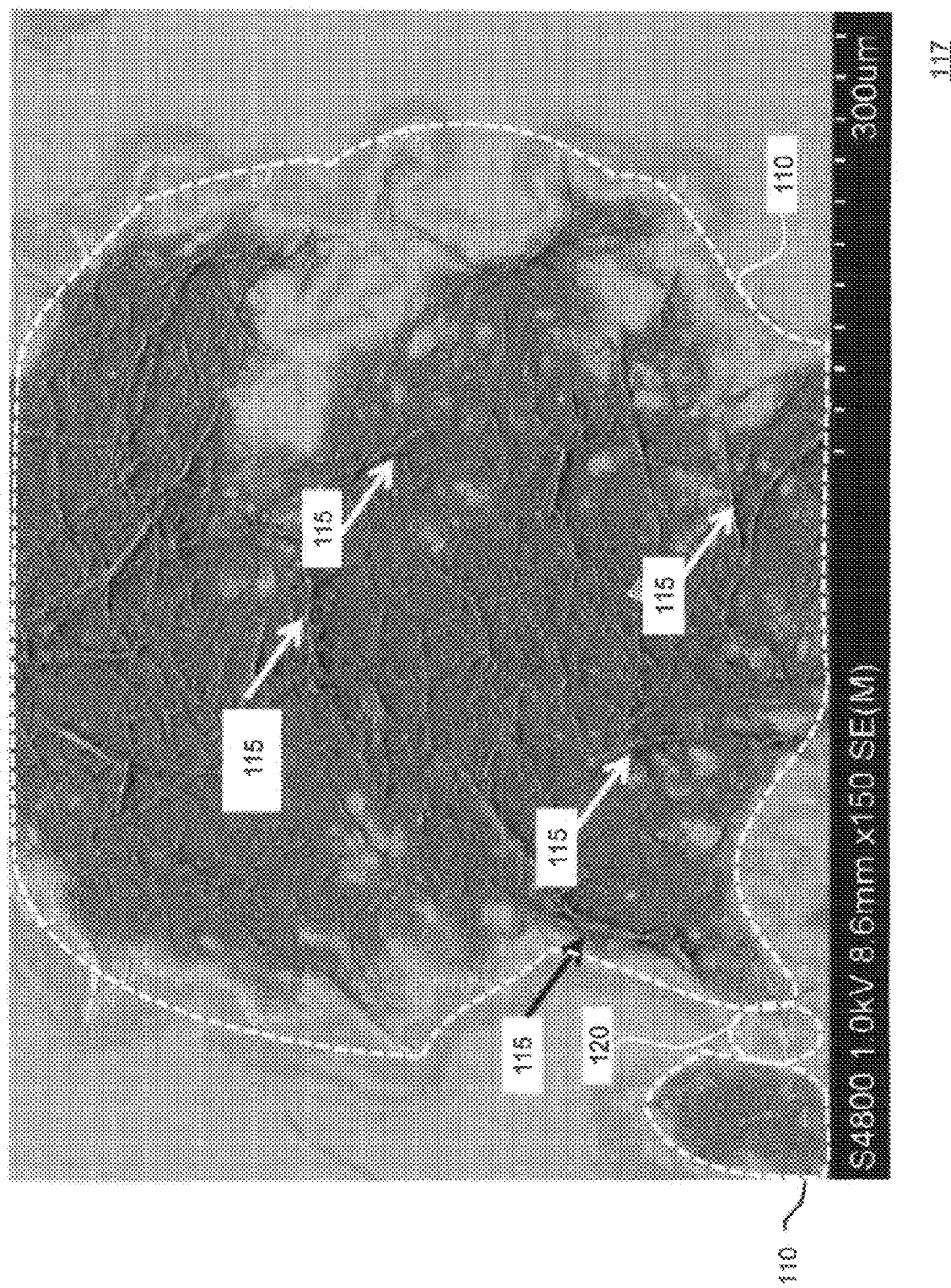
FIG. 5 is a SEM image of a CNT agglomerate 117 including the mesh body 113 and a trunk section 115 related to one embodiment of the present invention.

The CNT agglomerate 117 is preferred to be arranged with the trunk part 115 comprised from a plurality of orientated CNTs as shown in FIG. 4 and FIG. 5. The trunk part 115 has a higher density than the periphery mesh body 113 and is an agglomerate of fiber shaped CNTs comprised from a plurality of orientated CNTs. An unlimited number of CNTs break away from the trunk part 115 and assemble to form the mesh body 113. In addition, pairs of trunk parts 113 repeatedly fuse together to form a network of developed CNTs within the CNT agglomerate 117. Each of the trunk part 115 and the mesh body 113 within the CNT agglomerate 117 are considered to play the role of veins, arteries and capillary vessels within the human body. In other words, the mesh body 113 is a network of highly developed CNTs extending to small sections throughout a wide area and is an area where a different material to the CNTs of a dispersion medium etc and the CNT agglomerate 117 mutually operate with good efficiency. The trunk part 115 has a function for transmitting effectively without attenuation electrons, photons and mechanical stress within the CNT agglomerate 117 provided by the mesh body 113 as a result of this mutual operation. That is, the CNT agglomerate 117 which includes the trunk part 115 can sufficiently demonstrate the inherent properties of a CNT in order to efficiently transmit electrons, phonons and mechanical stress between CNTs when manufacturing a compact or composition from the CNT dispersion 100.

Figure 6:
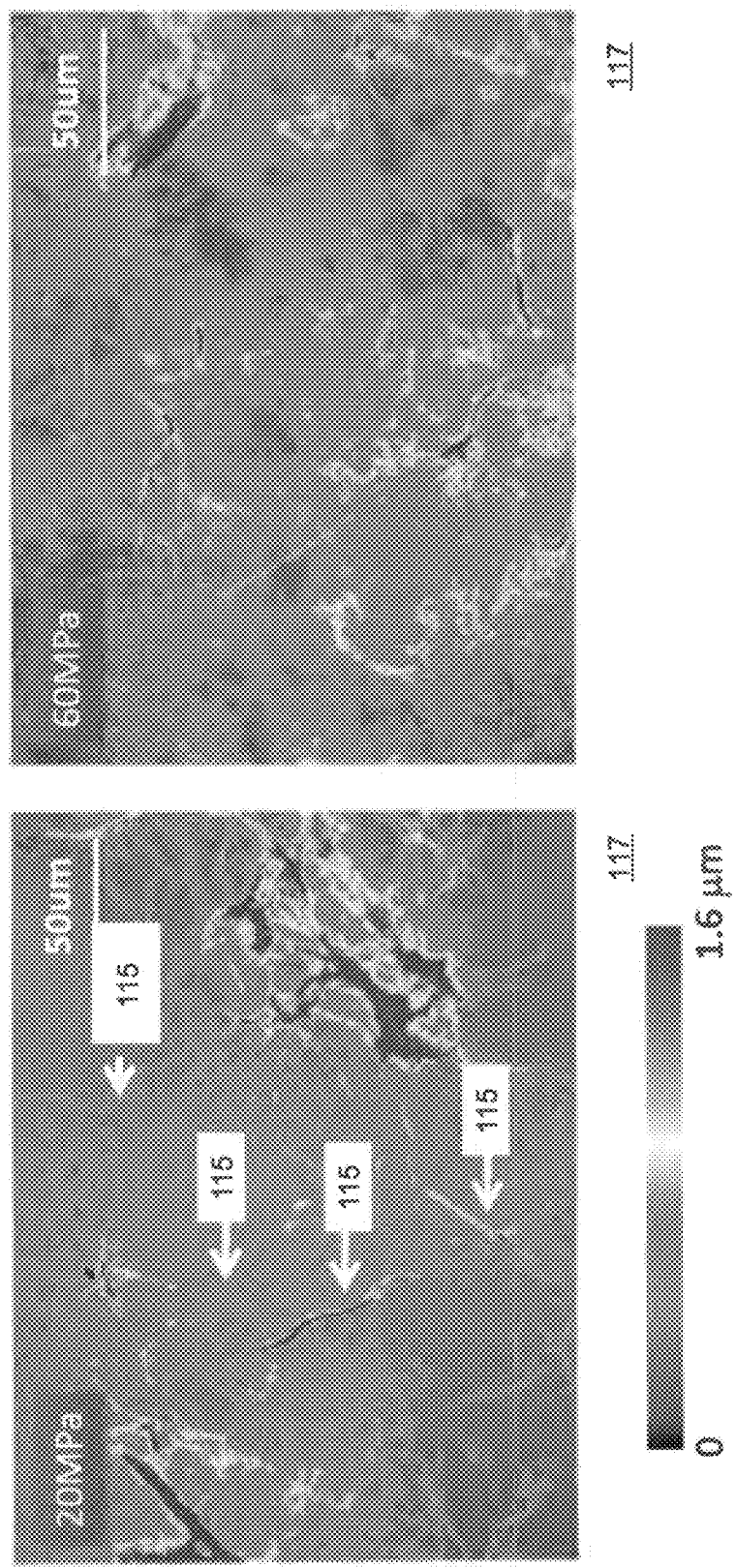
FIG. 6 is a SEM image of a CNT agglomerate 117 including the mesh body 113 and a trunk section 115 related to one embodiment of the present invention.

Because the trunk part 115 has a high density of CNTs, the height of trunk part 115 becomes greater than the periphery mesh body 113 when coating the CNT agglomerate 117 on a substrate. In order to stipulate the trunk part 115 which includes the CNT agglomerate 117, the CNT agglomerate may be coated on a substrate using the method described above and observed using a laser microscope. Specifically, as is shown in FIG. 6, the height of the CNT agglomerate 117 is shown using a laser microscope which is higher than the height of the periphery and a fiber shaped structure comprised of a plurality of orientated CNTs can be stipulated as the trunk part 115.

Figure 7:
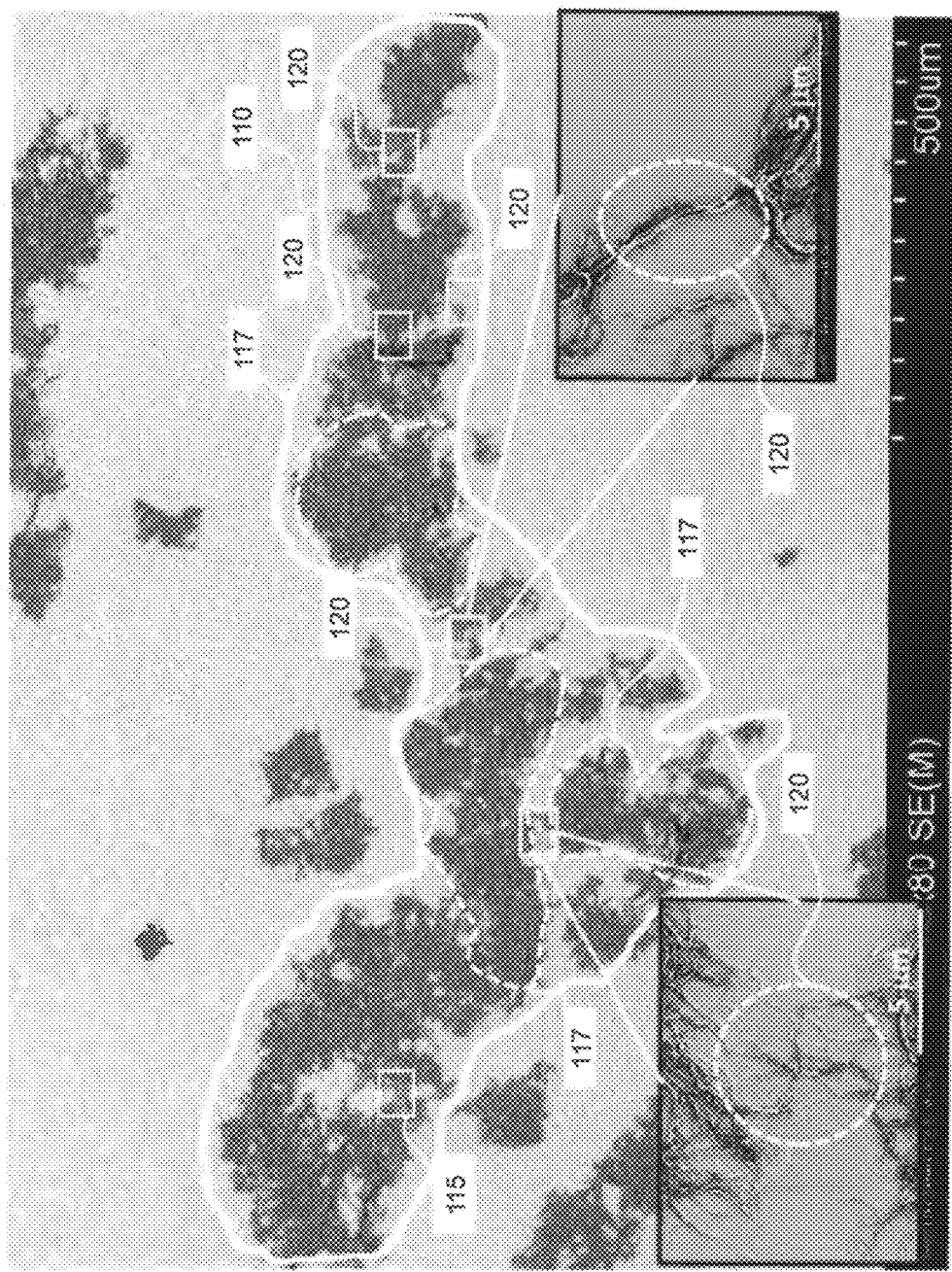
FIG. 7 is a SEM image of the CNT group 110 related to one embodiment of the present invention.

Furthermore, it is preferred that a connection part arranged with CNTs exists between adjacent CNT agglomerates 117. Here connection parts 120 which connect a plurality of CNT agglomerates 117 is called a CNT group 110. An example of the CNT group 110 is shown in FIG. 7. The CNT group 110 has a CNT network which is linked up to a further distance than an isolated CNT agglomerate 117, the inherent properties of a CNT can be sufficiently demonstrate when manufacturing a compact or composition from the CNT dispersion 100.

Figure 8:
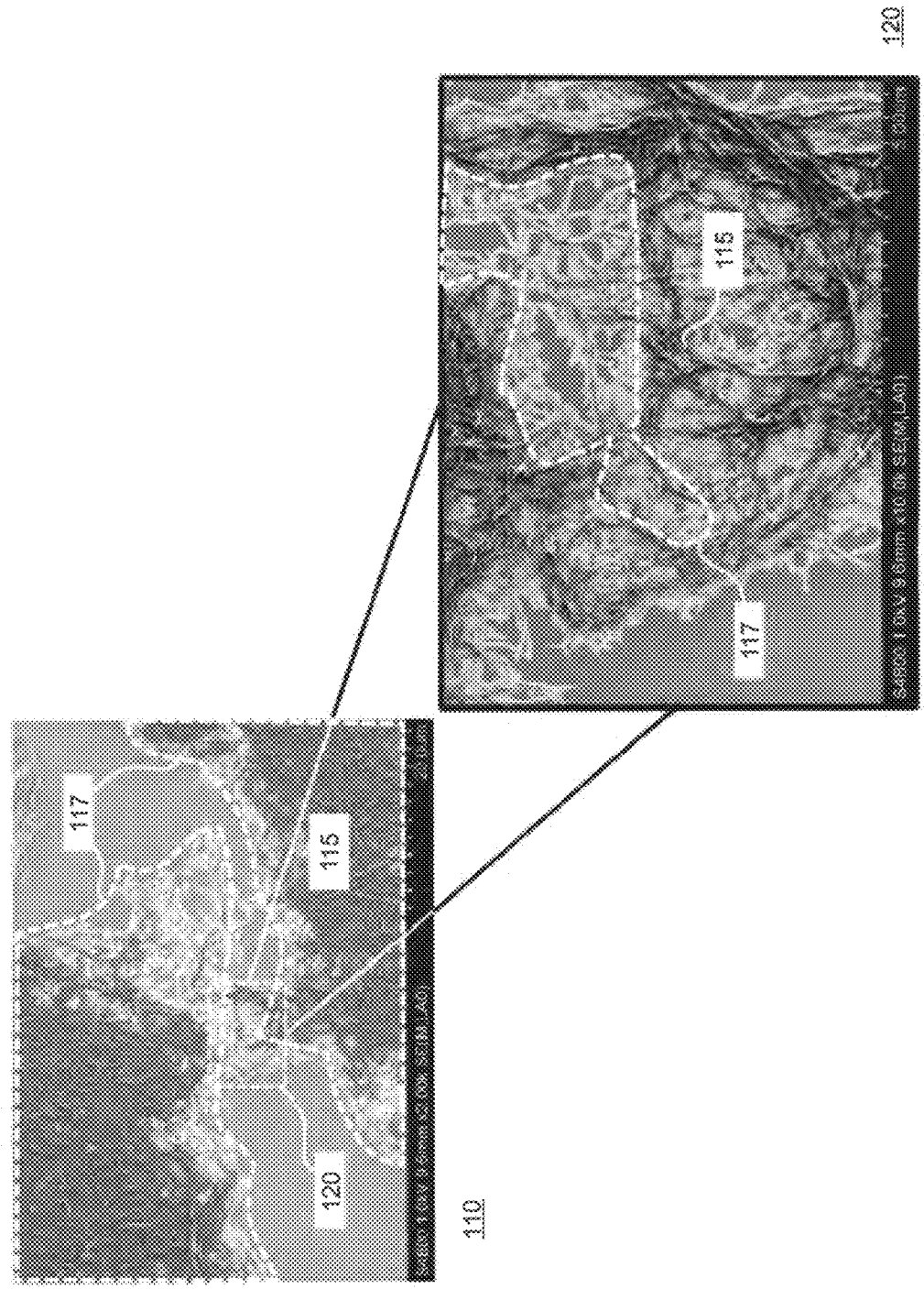
FIG. 8 is a SEM image of a connection part 120 of the CNT agglomerate 117 related to one embodiment of the present invention.
Figure 9:
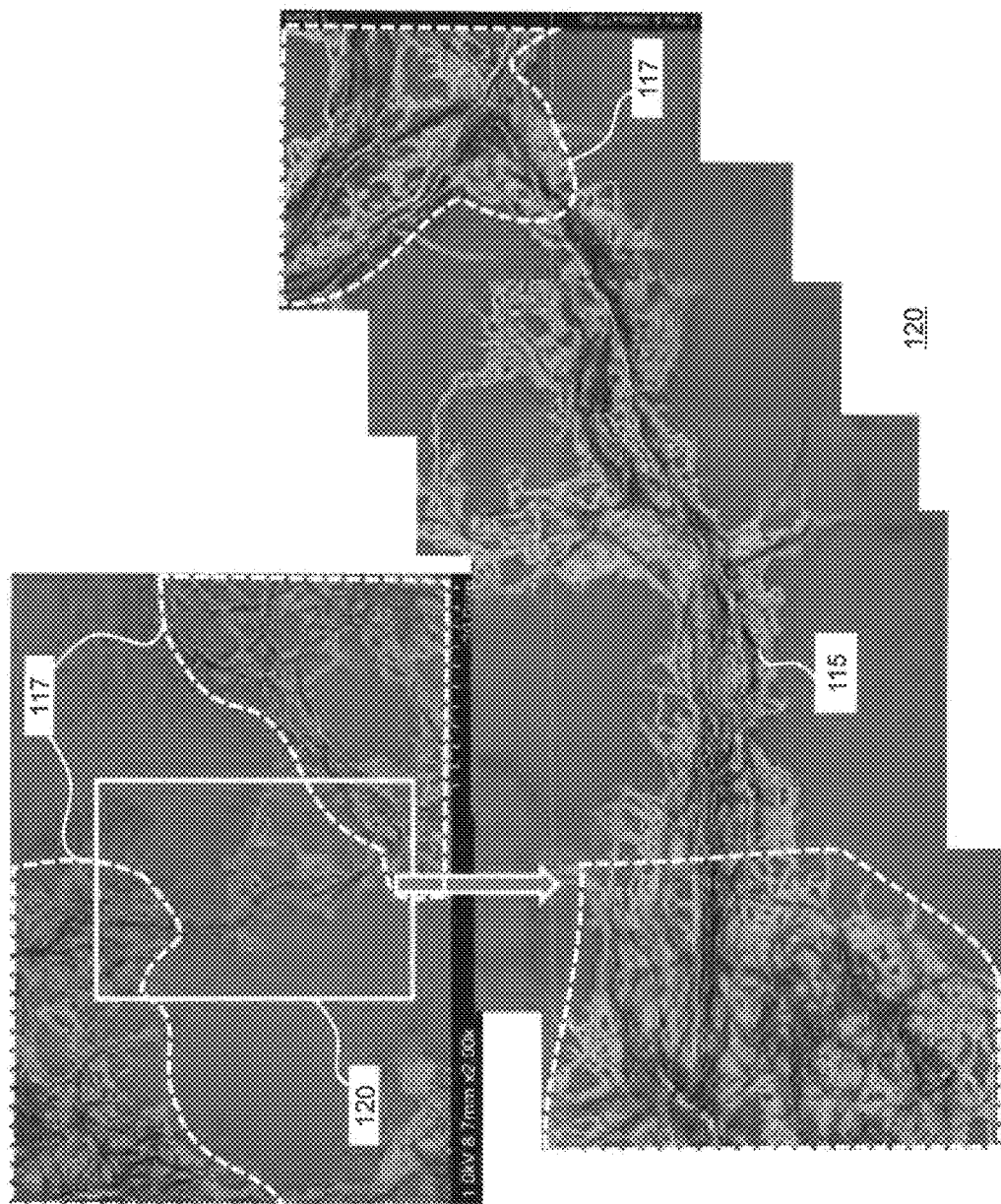
FIG. 9 is a SEM image of a connection part 120 of the CNT agglomerate 117 related to one embodiment of the present invention.
Figure 10:
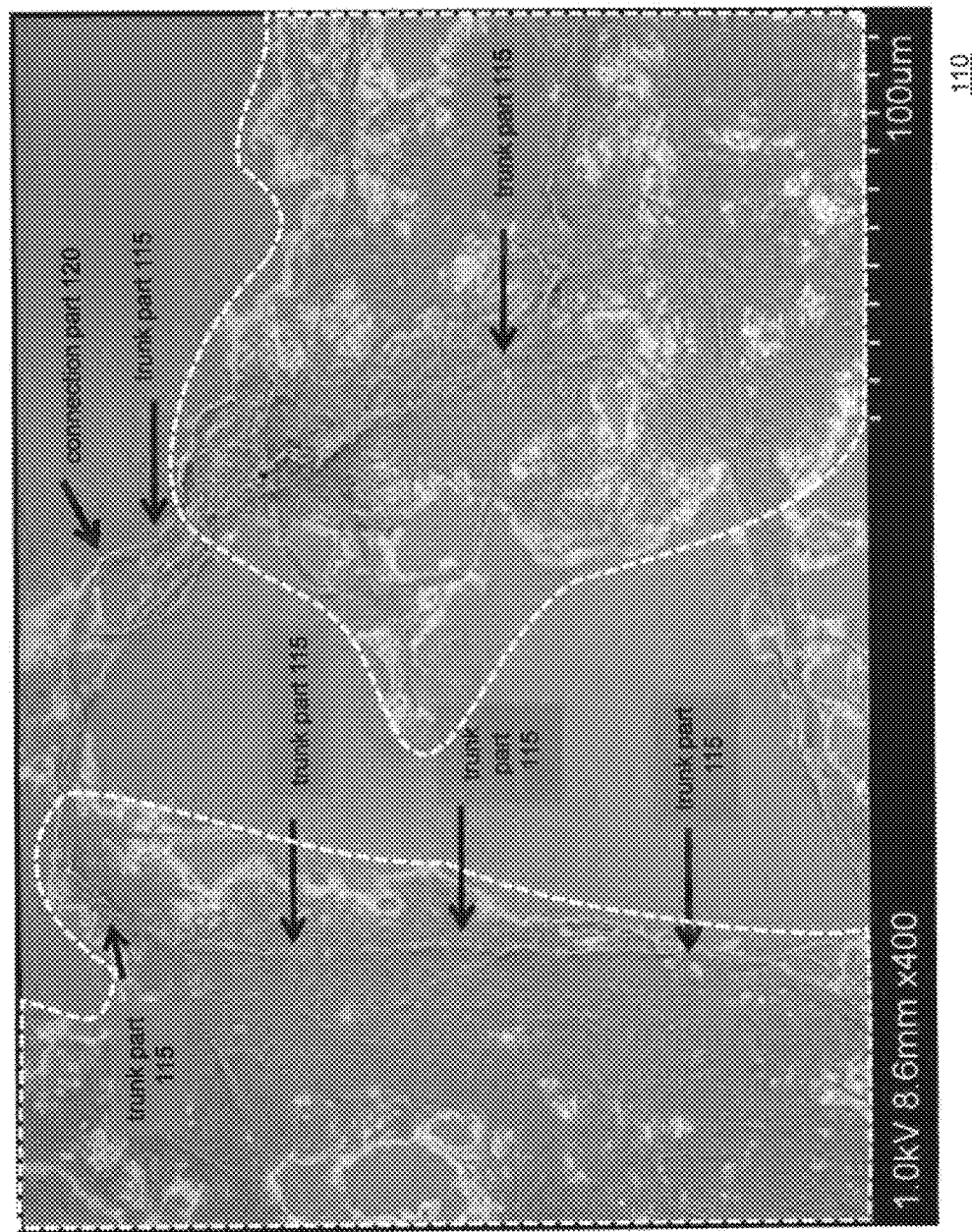
FIG. 10 is a SEM image of a connection part 120 of the CNT agglomerate 117 related to one embodiment of the present invention.

It is necessary to arrange the connection part 120 with the mesh part 113 (FIG. 8) and/or the trunk part 115 (FIG. 9). In addition, when the connection part 120 is arranged with the trunk part 115, the trunk part 115 arranged on a CNT agglomerate 117 is preferred to extend to the connection part 120 as shown in FIG. 10. Because this type of structure provides the CNT agglomerate 117 at the connection part with good electrical, thermal and mechanical connection, the inherent properties of a CNT can be sufficiently demonstrate when manufacturing a compact or composition from the CNT dispersion 100.

The CNT agglomerate 117 used in the CNT dispersion 100 related to an embodiment of the present invention is preferred to include single-walled CNTs. A single-walled CNT has a large specific surface area and thus is suited to obtaining a stable dispersion. The ratio of single-walled CNTs in a CNT agglomerate 117 (ratio occupied by single-walled CNTs among CNTs (double-walled ratio, multi-walled ratio) within the CNT agglomerate 117) is preferred to be 70 or more out of 100 in order to obtain a large specific surface area and 75 or more is particularly preferable. Although all the CNTs may be single-walled CNTs, from the point of the actually obtained properties and manufacturing efficiency, the upper limit of the number of single-walled CNTs is 998 or less out of 1000.

The single-walled CNT ratio within the CNT agglomerate 117 described above was observed at a magnification at 400,000 times using a transparent type electron microscope (TEM) and it possible to confirm the number of single-walled CNTs by evaluating the number of layers with respect to 100 arbitrarily extracted CNTs from the field of view which is the CNT agglomerate 117 which is 10% of the field of view surface area among a field of view of a 75 nm square. In the case where 100 CNTs cannot be measured within one field of view, a measurement is taken from a plurality of fields of view until the number reaches 100. At this time, one CNT is calculated if a part of a CNT is visible in a field of view and it not always necessary to see both ends of the CNT. In addition, although it is possible that two CNTs confirmed within a field of vision are linked as one CNT outside a field of vision, they are counted as two CNTs.

If the CNTs are mainly non-aperture CNTs then the specific surface area of a CNT which forms the CNT agglomerate 117 of the present invention is preferred to be 600 m$^2$/g or more and more preferably 700 m$^2$/g or more or still more preferably 800 m$^2$/g or more and yet more preferably 1000 m$^2$/g or more. In addition, if the CNTs are mainly aperture CNTs, the specific surface area is preferred to be 1300 m$^2$/g or more and more preferably 1500 m$^2$/g or more. Although the CNT relative surface is preferred to be as large as possible, a non-aperture CNT is explained as having a specific surface area of 1300 m$^2$/g and an aperture CNT is explained as having a specific surface area of 2600 m$^2$/g according to a theoretical calculation. Because the CNT agglomerate 117 having such a high specific surface area has a large surface area at which the CNT and dispersion medium contact, the mutual effects of the CNTs and dispersion medium increase and the CNT agglomerate 117 is stably dispersed within the dispersion medium. Because a CNT agglomerate 117 containing mainly CNTs which have a specific surface area which does not reach 800 m$^2$/g has a small surface area in which CNT and dispersion medium mutually operate, such a surface area is not desirable for stably dispersing the CNT agglomerate 117.

A CNT which forms the CNT agglomerate 117 related to the present invention is preferred to contain a carbon purity of 98 mass % or more and/or metal impurities of 1% by mass or less. The impurities obstruct formation of the mesh body 113 and dispersion of the CNTs. A CNT including a carbon purity of 98 mass % or more and/or metal impurities of 1% by mass or less is desirable for creating a stable CNT dispersion 100. The purity of the CNTs of the present invention are obtained from element analysis results using a fluorescent x-rays. Although there is no upper limit to the carbon purity, from the viewpoint of manufacture, it is difficult to obtain a carbon purity of 99.9999% or more. Although there is no lower limit to the metal impurities, formation of a good mesh body 113 is obstructed when the carbon purity is 98% or less and metal impurities are 1% by mass or more.

The CNT agglomerate 117 related to the embodiment of the present invention has a weight reduction of 10% or less from 200° C. to 400° C. at a thermogravimetry when temperature is increased by 1° C. per minute. This weight reduction can be measured by a thermal analysis of the CNT agglomerate 117 under an air atmosphere. About 1 mg of a sample is set in a differential thermal analyzer, and the temperature is increased from room temperature to 900° C. at a speed of 1° C. per minute. Weight reduction from 200° C. to 400° C. means a ratio of the amount of weight reduction between 200° C. to 400° C. with respect to the amount of weight reduction from room temperature to 900° C.

Because carbon purity such as amorphous carbon except a CNT generally breaks down at 400° C. or less, when a thermal weight measurement of the CNT agglomerate 117 including carbon impurities is performed, weight reduction is observed from 200° C. to 400° C. The greater the amount of carbon impurities the large the weight reduction rate of from 200° C. to 400° C. When the CNT agglomerate 117 includes carbon impurities, the carbon impurities stick CNT pairs together and thus the dispersion properties of the CNT agglomerate drop. Therefore, a CNT agglomerate 117 with few carbon impurities is preferred in order to obtain a stable CNT dispersion 100.

The CNT agglomerate 117 related to the embodiment of the present invention includes excellent properties such as stable dispersion within a dispersion medium in order to obtain the properties and structure described above. As described below, the CNT dispersion 100 manufacture by the method of the first example maintains dispersion without the CNT agglomerate 117 and the dispersion medium separating even when kept standing for six months. However, the CNT dispersion 100 of comparative example 1 could only maintain dispersion for about one to two days and the CNT agglomerate and dispersion medium separated.

Figure 11:
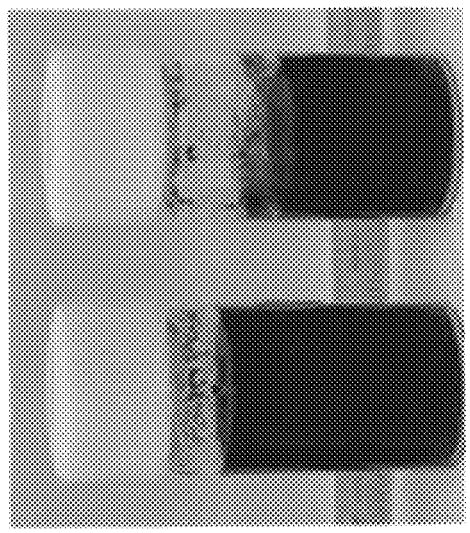
FIG. 11 is an optical photograph of a CNT dispersion 100 related to one embodiment of the present invention left for six months.
Figure 12:
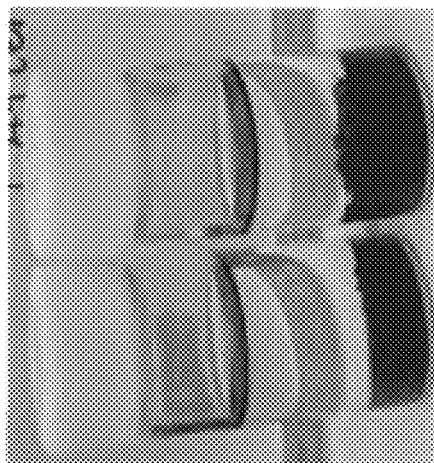
FIG. 12 is an optical photograph of a CNT dispersion 1000 of a comparative example left for six months.

Here dispersion means a state in which the CNT agglomerate 117 is visually scattered within a dispersion medium as is shown in FIG. 11. In addition, separation here means a state in which the CNT agglomerate is visually divided and apart from the dispersion medium as is shown in FIG. 12. The CNT agglomerate 117 and dispersion medium do not separate even if the CNT dispersion 100 related to an embodiment of the present invention is left for 10 days and more preferably 20 days.

(Manufacturing Method of a CNT Dispersion)

Although there is not limitation to the method of manufacturing a CNT agglomerate as long as a CNT agglomerate which meets the conditions set forth in the present specification is obtained, the following manufacturing method is exemplified.

Figure 13:
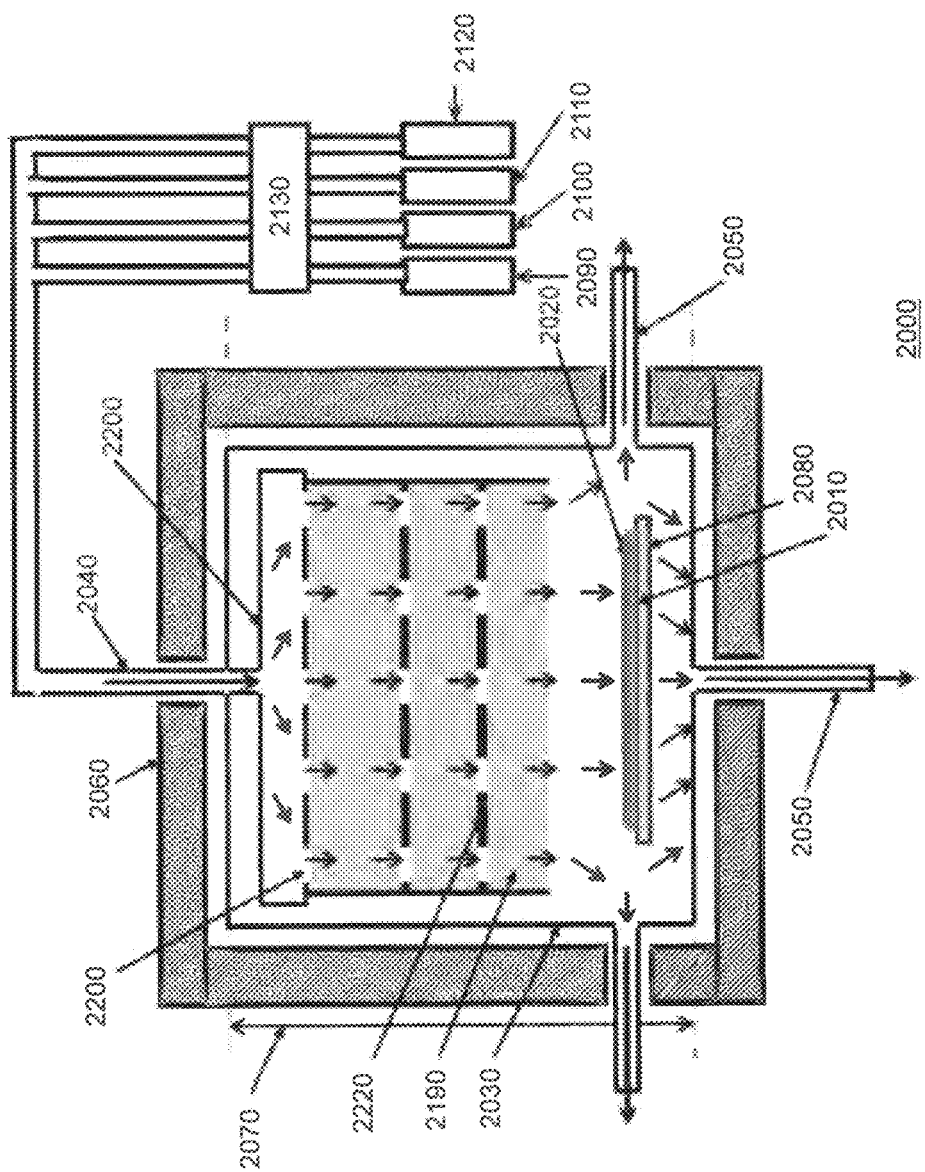
FIG. 13 is an exemplary diagram of a synthesis device 2000 of the CNT dispersion 100 related to one embodiment of the present invention.

An example of a synthesis device of a CNT bulk agglomerate 10 dispersed in the CNT dispersion 100 applied with the present invention is shown in FIG. 13. The synthesis device 2000 is arranged with a synthesis furnace 2030 comprised from silica glass for example which receives a substrate 2010 arranged with a catalyst layer 2020, a gas supply pipe 2040 arranged on an upper wall of the synthesis furnace 2030 and connected to the synthesis furnace 2030, a gas discharge pipe 2050 arranged on a lower wall or side wall on the down flow side and connected to the synthesis furnace 2030, a heating means 2060 arranged on the exterior periphery of the synthesis furnace 2030 and comprised from a resistance heat generating coil for example, a heating temperature adjustment means for adjusting the temperature within the furnace to a certain temperature, and a heating region 2070 within the synthesis furnace 2030 heated to a certain temperature by the heating means 2060 and heating temperature adjustment means. In addition, a substrate holder 2080 is arranged for holding the substrate 2010 arranged with the catalyst layer 2020 in the heating region 2070 within the synthesis furnace 2030 so that a heated volume becomes larger than a discharge volume.

A gas flow formation means 2210 for distributing and dispersing a source gas supplied from the gas supply pipe 2040 and forming a source gas flow which flows in a plurality of directions is arranged within the heating region 2070 above the substrate holder 2080 and/or the catalyst layer 2020. The gas flow formation means 2210 forms a source gas flow in a plurality of directions roughly parallel to the surface of the substrate 2010. In addition, a plurality of gas ejection means 2220 for forming a source gas flow in a roughly perpendicular direction to the plane of the substrate 2010 is arranged on the gas flow formation means 2210. The gas ejection means 2220 is arranged in plane roughly parallel to the surface of the substrate 2010.

By using this gas flow formation means 2210 it is possible to contact with a catalyst from a roughly perpendicular direction to the plane of the substrate 2010 after a source gas supplied from the gas supply pipe 2040 is developed and dispersed to a plane roughly parallel to the plane of the substrate 2010. As a result, because it is possible to uniform the supply amount of the source gas per unit volume to a region arranged with a catalyst on the substrate 2010 and contact with the catalyst, it is possible to obtain a CNT bulk agglomerate 10 including a uniform structure and properties which is suitable in manufacturing a stable CNT dispersion 100.

A staying time period adjustment means 2140 for increasing and/or adjusting a staying time period formed from a turbulence flow control means 2220 comprised from a plate shaped rectifier plate arranged with a plurality of holes which is connected to and linked to the gas flow formation means 2210 with a heated volume intentionally increased and/or adjusted is arranged between the gad injection means 2200 and the catalyst layer 2020 and. The distance between the surface of the catalyst layer 2020 arranged on the substrate 2010 and the gas injection means 2200 arranged facing the catalyst surface is set at 40 mm or more (or more preferably 70 mm) in order to increase a heated volume.

By adopting this structure, the cross sectional area of a flow path of a source gas increases within the staying time period adjustment means 2140 and it becomes easier to increase and adjust a heated volume and staying time period.

A heated volume of a source gas heated within the heating region 2070 is increased and a staying time period the lengthening of which had not conventionally been examined was lengthened. As a result, breakup of the source gas is encouraged and a more suitable source gas to grow a CNT is contacted with a catalyst and by more efficiently transforming a source gas into a CNT than conventionally, it is possible to control the attachment of carbon impurities to the CNT and thus obtain a stable CNT dispersion 100.

The turbulence flow control means 2220 controls any turbulence of the source gas within the staying time period adjustment means 2140, makes the staying time period of the source has flowing through the staying time period adjustment means 2140 roughly equal and as a result demonstrates a dramatic effect of making the staying time period of the source gas when in contact with the catalyst on the substrate 2010 roughly equal. It is easy for turbulence to occur within the heating region 2070 including the heated volume which is intentionally increased and although the staying time period of a source gas which flows through the staying time period adjustment means 2140 is lengthened when turbulence is present it does not become equal. Making the staying time period equal is suitable for controlling the generation of carbon impurities and thus a stable CNT dispersion 100 is obtained.

The synthesis device is arranged with a source gas cylinder 2090 for receiving carbon compounds which become the source material of a CNT, a catalyst activator material cylinder 2100 for receiving catalyst activator materials, an atmosphere gas cylinder 2110 for receiving the source gas or carrier gas of the catalyst activator material, and a reduction gas cylinder 2120 for reducing a catalyst, and a carbon weight flux adjustment means 2130 which can control the supply amount of gas from each of the cylinders using gas flow device is also arranged. The carbon weight flux adjustment means 2130 is suitable for contacting an optimized amount of source gas to the catalyst.

Manufacture of the CNT bulk agglomerate 10 related to the present invention is for manufacturing a catalyst layer on the substrate 2010 and for chemically vapor growing (synthesis) a plurality of CNTs from the catalyst.

Figure 14:
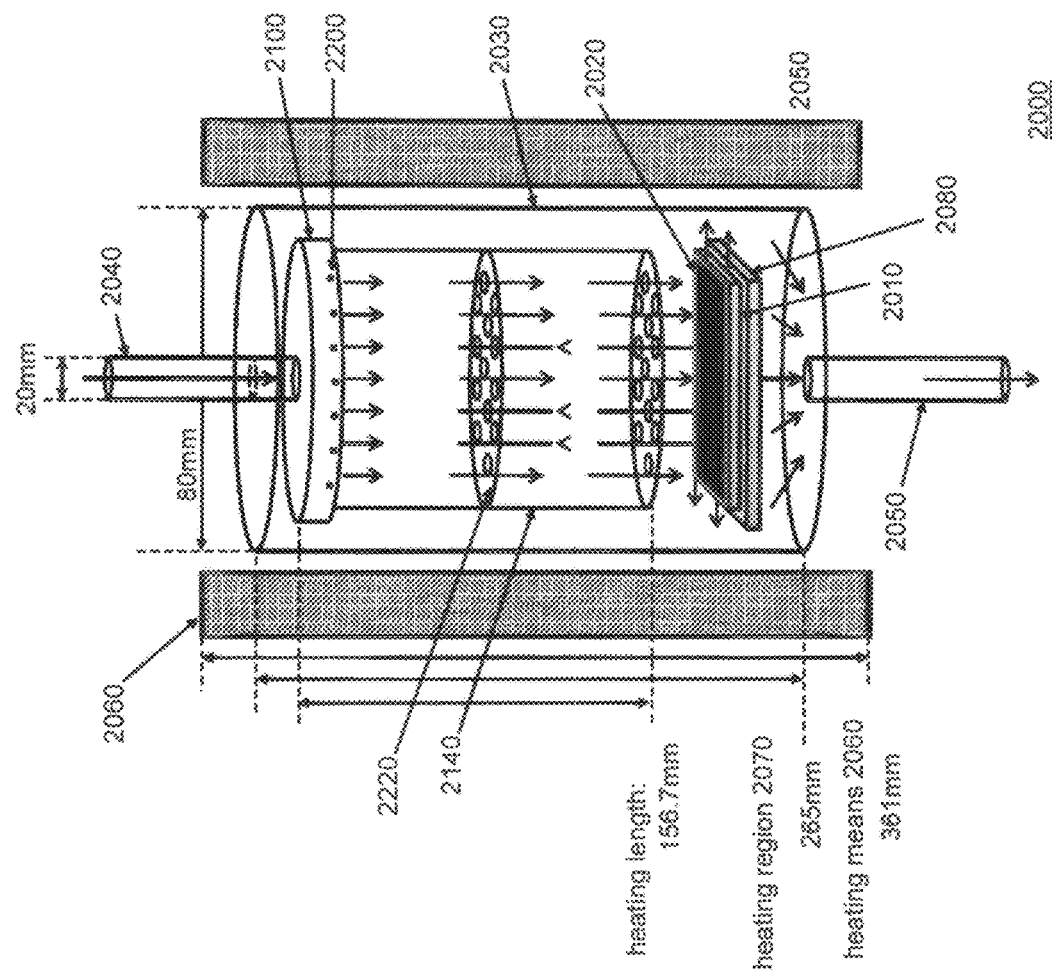
FIG. 14 is an exemplary diagram of the synthesis device 2000 of the CNT dispersion 100 related to one embodiment of the present invention.
Figure 15:
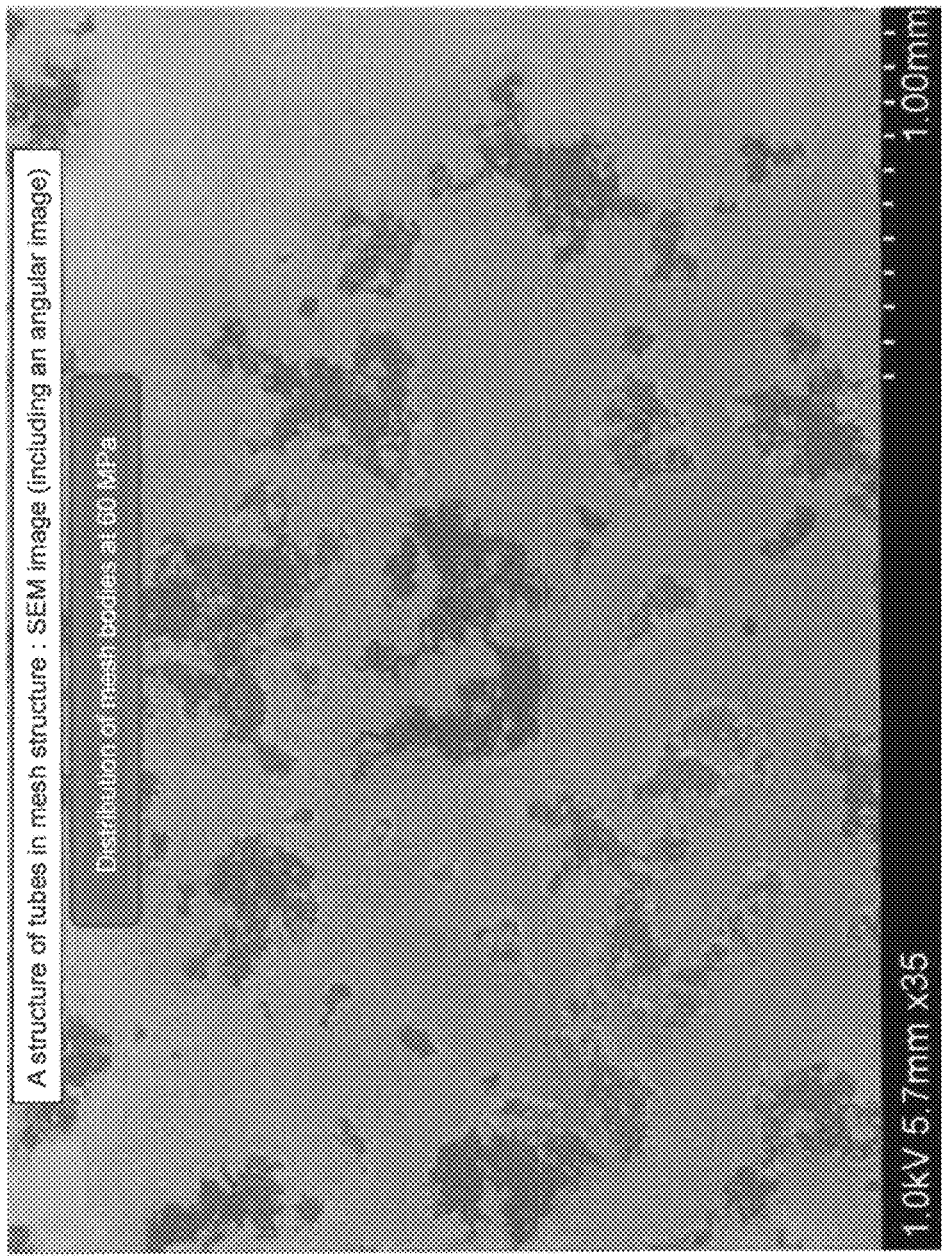
FIG. 15 is a SEM image of the CNT agglomerate 117 related to one embodiment of the present invention.
Figure 16:
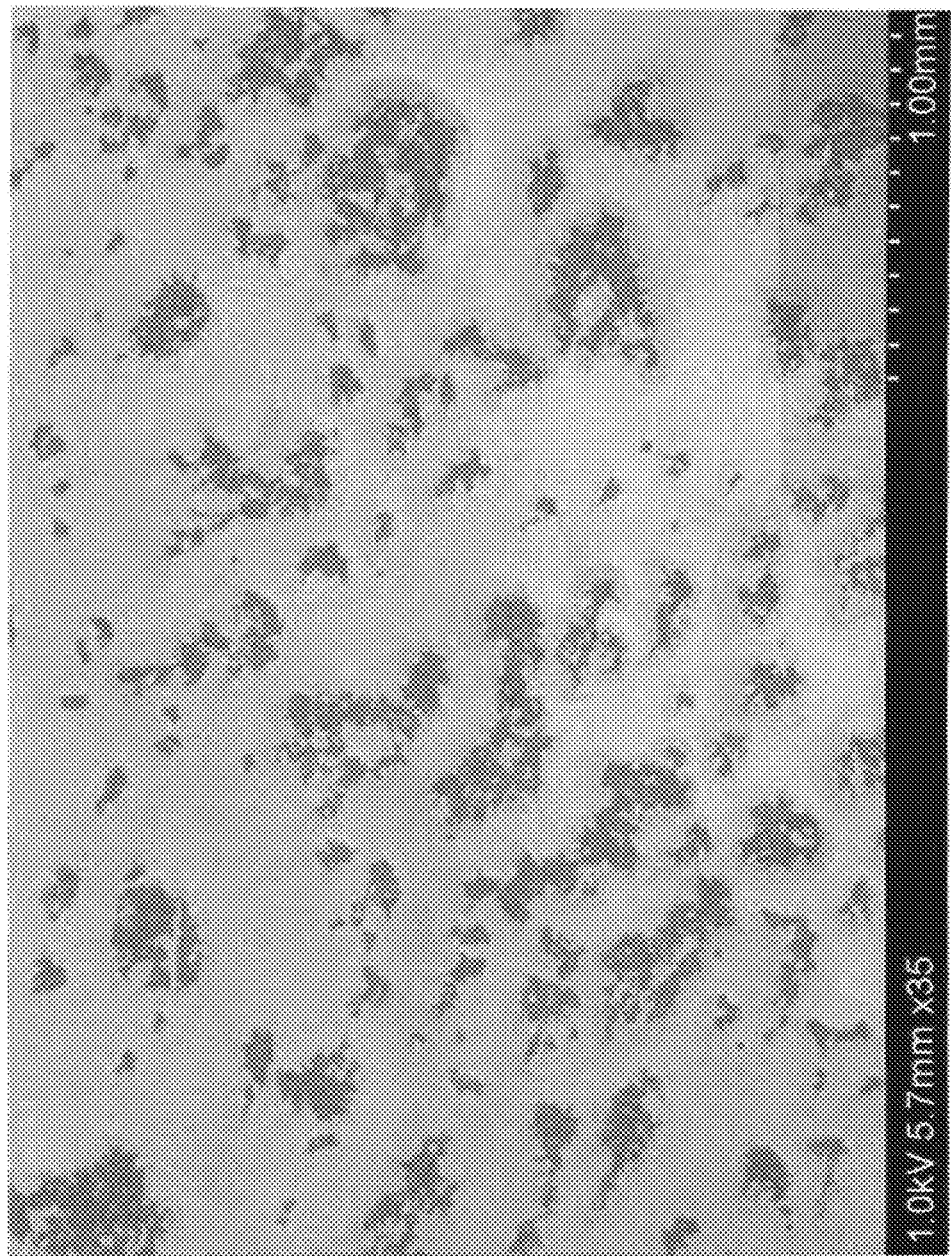
FIG. 16 is a SEM image of the CNT agglomerate 117 related to one embodiment of the present invention.
Figure 17:
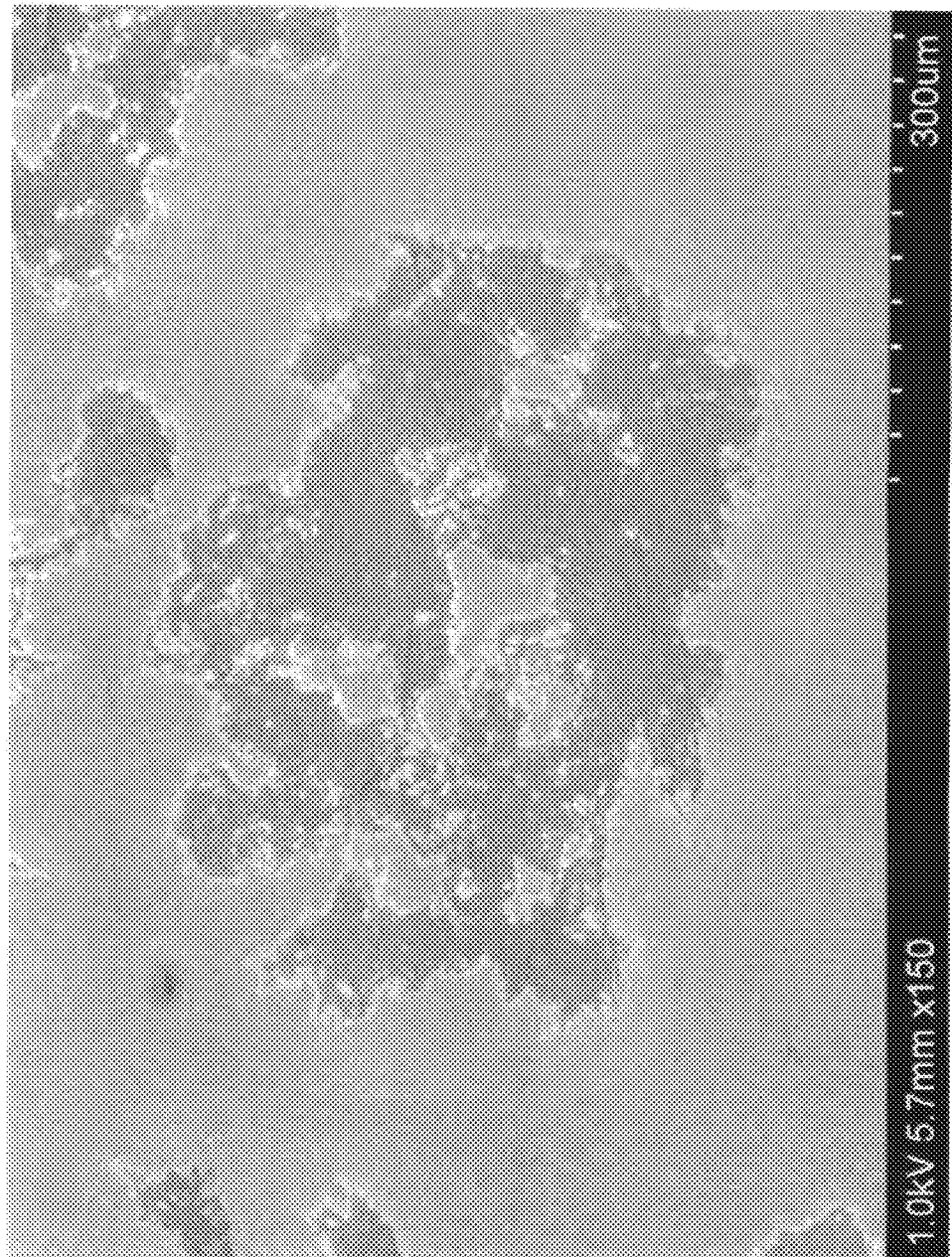
FIG. 17 is a SEM image of the CNT agglomerate 117 related to one embodiment of the present invention.
Figure 18:
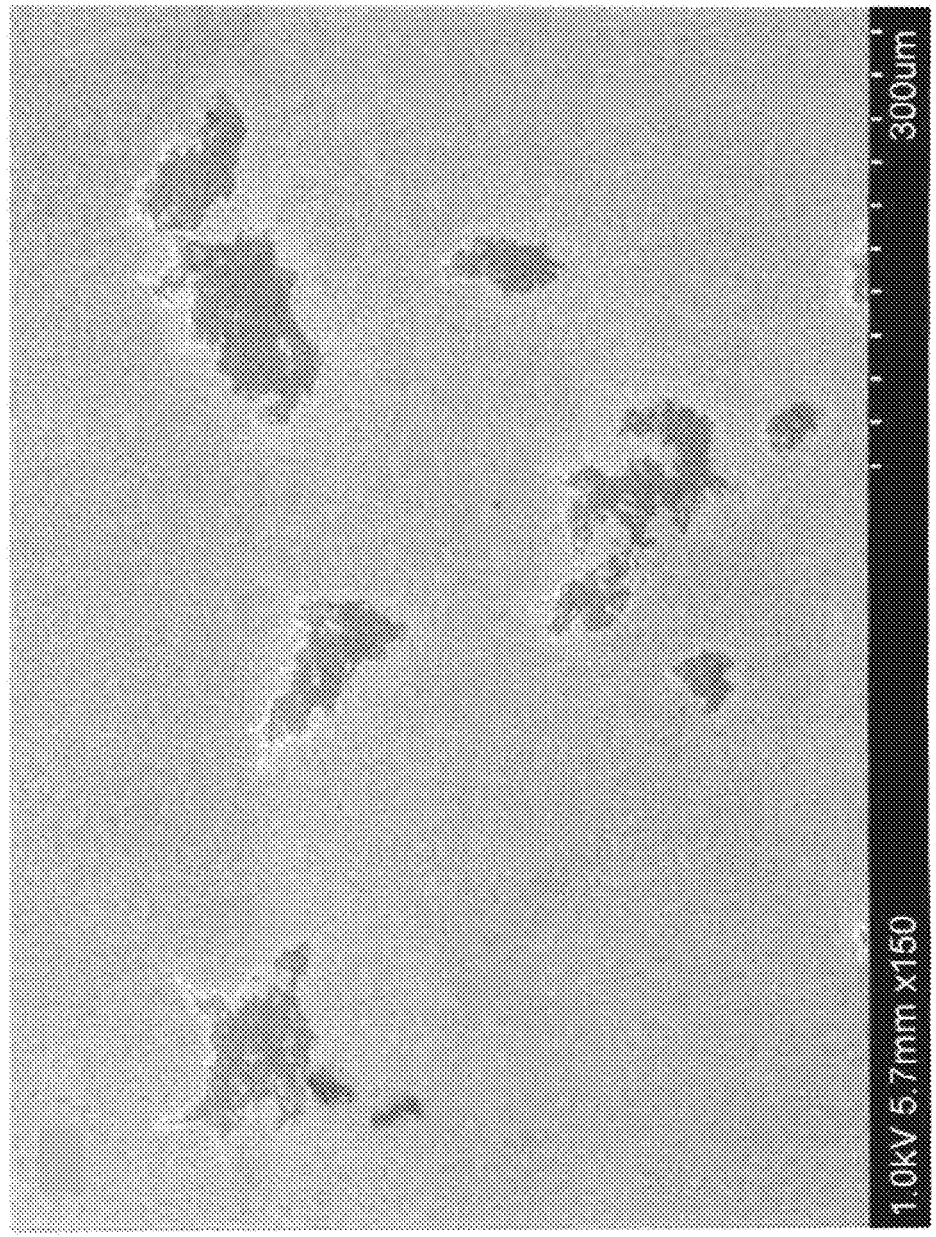
FIG. 18 is a SEM image of the CNT agglomerate 117 related to one embodiment of the present invention.

Referring to FIG. 13 and FIG. 14, first the substrate 2010 (silicon wafer for example) grown with a catalyst layer 2020 (alumina iron thin film for example) in advance in a separate process is transferred to the interior of the synthesis furnace 2030 which is filled with an atmosphere gas (helium for example) supplied from the gas supply pipe 2040, and placed into the substrate holder 2080. At this time, the substrate 2010 is arranged so that the surface of the catalyst layer 2020 and the flow path of the source gas intersect in a roughly perpendicular direction and the source gas is efficiently supplied to the catalyst.

In addition, by arranging the substrate 2010 within the heating region 2070 so that the discharge volume 2160 becomes smaller than the heated volume 2150, the source gas which contacts with the catalyst layer 2020 is rapidly discharged. Furthermore, the staying time period of the source gas within the synthesis surface 2030 is adjusted in advance by the staying time period adjustment means 2140 to be optimal for growing a CNT.

Next, the interior of the synthesis furnace 2030 is heated to a certain temperature (750° C. for example) while supplying a reduction gas (hydrogen for example) to the interior of the synthesis furnace 2030 from the gas supply pipe 2040 and a formation process is performed for maintaining this state for a desired time period. The catalyst layer 2020 is transformed into microparticles by this reduction gas and is adjusted to a suitable state as a CNT catalyst. A catalyst activator material may be added if necessary in the formation process.

Next, the supply of the reduction gas and atmosphere gas from the gas supply pipe 2040 is stopped or reduced according to a desired reaction condition for example using the carbon weight flux adjustment means 2130 and a source gas (ethylene for example), an atmosphere gas and catalyst activator material (water for example) are supplied from the gas supply pipe 2040. These gases which are supplied from the gas supply pipe 2040 are blow to the surface of the catalyst layer 2020 on the substrate 2010 in a roughly uniform amount from a roughly perpendicular direction to the plane of the substrate 2010 from an injection hole after forming a gas flow directed in a plurality of directions in a roughly parallel direction to the plane of the substrate 2010.

In addition, these gases are contacted with surface of the catalyst layer 2020 in an optimized amount using the carbon weight flux adjustment means 2130 after flowing the increased and adjusted heated volume 2150 and after optimizing the staying period of time by the staying time period adjustment means, and a CNT is efficiently grown (growth process) at a high speed and high yield from the catalyst microparticles attached to the substrate 2010. Furthermore, these gases are contacted with the catalyst microparticles on the substrate 2010 at a roughly equal staying time period using the turbulence control means 2200. In addition, after contacting with catalyst layer 2020 the gases are rapidly discharged from the gas discharge pipe 2050 and the generation of carbon impurities is controlled to a minimum.

After production of a CNT is completed, in order to control the source gas, catalyst activate material and any resolvent, remaining within the synthesis furnace 2030 or any carbon impurities existing within the synthesis furnace 2030 from being attached to the CNT bulk agglomerate 10, only the atmosphere gas is flown and contact of impurities with the CNT bulk agglomerate 10 is controlled (carbon impurities attachment control process).

In this way, a plurality of CNTs simultaneously grown from the catalyst layer 2020 on the substrate 2010 are grown in a direction intersecting the catalyst layer 2020, are orientated and a CNT bulk agglomerate 10 with a largely even height and high specific surface area and high purity is formed. In the orientated CNT bulk agglomerate 10 synthesized by the method described above, CNT pairs appropriately wind together and can be easily peeled from the substrate in an agglomerate shape with an appropriate size without the CNTs becoming separated. Furthermore, the generation and attachment of carbon impurities to the CNT bulk agglomerate 10 are controlled and because appropriate gaps exist between CNTs, it is easy for CNTs to unwind and the level of dispersion is high. Furthermore, the CNTs have a high specific surface area. This type of CNT bulk agglomerate 10 is suitable for obtaining a stable CNT dispersion 100.

Next, the CNT bulk agglomerate 10 is peeled from the substrate using a physical, chemical or mechanical method. A peeling method using an electrical field, magnetic field, centrifugal force and surface tension force, a direct peeling method for mechanically peeling from the substrate or a peeling method using pressure or heat may be used as the peeling method. In addition, a method for peeling the CNT bulk agglomerate 10 from a substrate using a thin knife such as cutter may be used. A method of peeling from the substrate by sucking the CNT bulk agglomerate 10 using a vacuum pump is suitable for obtaining a CNT agglomerate 117 including a mesh body 113.

It is preferred that the CNT bulk agglomerate 10 related to an embodiment of the present invention is classified by a classification process. The classification process related to the present embodiment obtains a uniform sized CNT bulk agglomerate 10 by setting the size of the CNT bulk agglomerate 10 within a certain range. The CNT bulk agglomerate 10 which is peeled from a synthesis substrate also includes synthesized components with a large clump shaped size. Since the dispersion properties of the CNT bulk agglomerate 10 including these large sized clumps is low, the formation of a stable dispersion is obstructed. Thus, only a CNT bulk agglomerate 10 with the large sized clumps removed by passing the CNT bulk agglomerate 10 through a net, filter or mesh for etc is suitable for obtaining a stable CNT dispersion 100 using the following process.

It is preferred that a drying process is performed on the CNT bulk agglomerate 10 before a dispersion process. In particular, performing a drying process is suitable for increasing dispersion properties when a hydrophobic solvent is used. Because the CNTs which form the CNT bulk agglomerate 10 related to the embodiment of the present invention has a large specific surface area and appropriate pore diameter, the water component within air is easily adsorbed when storing in air and transporting. Because pairs of CNTs stick together due to water surface tension in a state where the water component is adsorbed, it is very difficult for the CNT bulk agglomerate 10 to unwind and formation of a CNT bulk agglomerate 10 including a mesh body 113 having excellent dispersion properties is prevented. Thus, by performing a drying process of the CNT bulk agglomerate 10 before a dispersion process, the water component included in the CNT bulk agglomerate 10 is removed and it is possible to increase the dispersion properties to a dispersion medium. It is possible to use a heat dryer or vacuum dryer for example in the drying process related to the present embodiment and heat vacuum drying is preferably used.

Next, the manufacturing method of the CNT dispersion 100 related to an embodiment of the present invention is explained. The CNT dispersion related to the present invention is manufactured by dispersing the CNT bulk agglomerate 10 which is peeled from the synthesis substrate described above into a dispersion medium. This type of CNT bulk agglomerate 10 is dispersed to a high degree by the dispersion process described above and becomes the CNT agglomerate 117 shown in FIG. 3.

In a conventional dispersion process of a CNT dispersion, it is possible to use dispersion device such as a mixer, a homogenizer, a colloid mill, a flowjet mixer, a dissolver, a paint conditioner, a Menton emulsifier, a jet mill, and an ultrasonic device to disperse the CNTs. In addition, it is also possible to use a known porphyrization means, for example ball milling (ball mill, vibration ball mill, planet mill, beads mill etc), sand milling, colloid milling, jet milling, roller milling, and furthermore, dispersers such as a vertical or horizontal type agitator mill, attritor, colloid mill, 3 roll mill, pearl mill, super mill, impeller, disperser, KD mill, dynatron or a pressure kneader can also be used. In particular, a method for dispersing CNTs using shear stress is preferred. A jet mill is preferred for the dispersion process of a dispersion of the CNT agglomerate 117 related to the embodiment of the present invention. In particular, it is possible to favorably use a wet type jet mill. A wet type jet mill squeezes mixed products in a solvent from a nozzle arranged in a sealed state within a pressure resistant container as a high speed flow. The CNT bulk agglomerate 10 is dispersed by collision of opposing flows, collision against container walls, turbulence produced by high speed flows and by a shear flow within the pressure resistant container. In the case where nano-jet mill (JN10, JN100, JN1000) manufactured by JOKOH ltd as the wet type jet mill, a processing pressure in the dispersion process of the CNT dispersion 100 related to an embodiment of the present invention is preferred to be a value within a range of 10 MPa or more and 150 MPa or less.

The CNT dispersion 100 related to an embodiment of the present invention manufactured as described above maintains excellent electrical properties, thermal conduction and mechanical properties of a CNT, has a high level of dispersion properties and a dispersion of a CNT agglomerate 117 arranged with a stable mesh body 113 can be provided.

It is possible to use any hydrophilic solvent or hydrophobic solvent as the solvent used in the dispersion medium of a CNT related to the present embodiment of the present invention. A carbonate group (ethylene carbonate, propylene carbonate, dimethyl carbonate, diethyl carbonate, methylethyl carbonate, butylene carbonate etc), an ether group (tetrahydrofuran etc), a ketone group (acetone etc), a lower alcohol group (methanol, ethanol etc), and acetonitrile etc are available as the hydrophilic solvent. A hydrocarbon group (toluene, benzene, xylene, hexane, cyclohexane etc), a hydrocarbon group containing chlorine (methylene chloride, chloroform, chlorobenzene etc), an ether group (dioxane, tetrahydrofuran, methyl cellosolve etc), an ether alcohol group (ethoxy ethanol, methoxyethoxy ethanol etc), an ester group (methyl acetate, ethyl acetate etc), a ketone group (cyclohexanone, methyl ethyl ketone, 4-methylpentane-2-on, methyl isobutyl ketone etc), an alcohol group (isopropanol, phenol etc), a lower carboxylic acid (acetic acid etc), an amine group (triethylamine, triemethanolamine etc), a polar solvent containing nitrogen (N, N-dimethylformamide, nitromethane, N-methylpyrrolidone etc), and a sulfur compound (dimethylsulfoxide etc) are available as the hydrophobic solvent. Methyl isobutyl ketone (referred to below as MIBK) which is a good CNT solvent is preferred as the solvent used for the CNT dispersion related to the present embodiment.

In the present invention, although it is possible to obtain a stable CNT dispersion with a high concentration, a dispersant may also be used in order to further improve dispersion properties and stability. Any known dispersant may be used and a surface acting agent or various high polymer materials etc may be added to the CNT dispersion 100. The dispersant is useful for improving the dispersion capability and dispersion stabilizing capability of the CNT bulk agglomerate 10. The surface acting agent is divided into an ionic surface acting agent and non-ionic surface acting agent. However, either surface acting agent can be used in the embodiment of the present invention. The following surface acting agents are available. The surface acting agent can be used alone or two or more can be mixed and used.

An ionized surface acting agent is divided into a cationic surface acting agent, an amphoteric surface acting agent and an anionic surface acting agent. Alkylamine salt, quaternary ammonium salt etc are available as the cationic surface acting agent. Alkylbetaine group surface acting agent, amine oxide group surface acting agent are available as the amphoteric surface acting agent. An alkyl benzene sulfonate such as dodecylbenzenesulfonic acid salt, an aromatic sulphonic acid surface acting agent such as dodecyl phenyl ether sulfonic acid, monosoup anion surface acting agent, ethyl sulfate surface acting agent, a phosphate surface acting agent and a carbonic surface acting agent are available as an anionic surface acting agent. Among these, because of dispersion capability, dispersion stability capability and ability to be dispersed in high concentrations, a product including an aromatic ring, that is, an aromatic ionic surface acting agent is preferred, in particular, an aromatic ionic surface acting agent such as alkyl benzene sulfonate, dodecyl phenyl ether sulfonate is preferred.

Sugar ester surface acting agents such as sorbitan fatty acid ester, polyoxyethylene fatty acid ester, fatty acid ester surface acting agents such as polyoxyethylene resin acid ether, polyoxyethylene fatty acid diethyl, ether surface acting agents such as polyoxyethylene alkyl ether, polyoxyethylene alkyl phenyl ether, polyoxyethylene polypropylene glycol, and aromatic nonionic surface acting agents such as polyoxyalkylene octylphenyl ether, polyoxyalkylene nonylphenyl ether, polyoxyalkyl dibutylphenyl ester, polyoxyalkyl styrylphenyl ester, polyoxyalkyl benzylphenyl ester, polyoxyalkyl bisphenyl ester, and polyoxyalkyl cumylphenyl ester are available as the nonionic surface acting agent. Among these, because of dispersion capability, dispersion stability capability and ability to be dispersed in high concentrations, an aromatic nonionic surface acting agent is preferred, and among these, polyoxyethylene phenyl ester is preferred.

By extracting the stable and high dispersion CNT dispersion 100 or CNTs including the CNT agglomerate 117 from the stable CNT dispersion 100 related to the present embodiment, it is possible to manufacture a CNT compact having excellent electrical, thermal conduction and mechanical properties. A CNT compact 150 refers to all everything that is in a structured state by molding or processing of the CNT agglomerate 117. In addition, molding or processing indicates all operations that have passed an operation or process where the shape of the CNT agglomerate 117 changes. Examples of a CNT compact are threads, chips, pellets, sheets, blocks or unwoven fabric which include the CNT agglomerate 117. A product obtained as a result of combining these and further performing molding or processing is also referred to as CNT compact.

A method of filtering a liquid including the CNT agglomerate 117, draining using an evaporation method and molding into a film shape or sheet shape and a method of inserting a liquid including the CNT agglomerate 117 into a mold and evaporating the dispersion medium can be exemplified as molding methods. In addition, it is also possible to use a method for compressing the CNT agglomerate 117 using a press or a method of shaving or cutting using a knife.

In addition, it is also possible to obtain the CNT compact 150 as a sheet or unwoven fabric such as what is called a bucky paper by depositing on filter paper by filtering the CNT dispersion 100. This type of thin film shaped CNT compact 150 includes excellent conductivity and can be favorably used as a capacitor electrode for example. In addition, the CNT compact 150 related to the present embodiment can be used as a thin film CNT compact 150 by spin coating, deep coating, spray up, coating, printing, extruding, casting or injecting the CNT dispersion 100 on a substrate such as a silicon wafer for example.

The conductivity of the CNT compact 150 and/or CNT agglomerate 117 is preferred to be 10 S/cm or more and more preferably 20 S/cm or more. Although there is no particular limitation to the conductivity upper limit, going beyond $10^4$ S/cm of the CNT itself is difficult.

A substrate is coated with the CNT dispersion 100 and/or is attached with the CNT agglomerate 117 and/or the CNT compact 150 and is unaffected by shape, material or attachment method. The substrate may have curved or flexible shape in addition to a planar shape and may be of any thickness. The material may be various types of metal, ceramic, silicon substrate or resin. In addition, it is not necessary for the entire surface of the substrate to be covered by the CNT dispersion 100 and/or the CNT agglomerate 100 and/or the CNT compact 150. For example, the substrate may be patterned using the CNT dispersion 100 and/or the CNT agglomerate 100 and/or the CNT compact 150, and the substrate surface may be partially exposed or formed into an electronic circuit. In addition, the CNT dispersion 100 and/or the CNT agglomerate 100 and/or the CNT compact 150 does not need to be attached by directly contact with the substrate but an intermediate layer may be arranged in order to improve thermal conductivity and adhesion etc with the substrate.

It is possible to disperse the CNT dispersion 100 of the present invention and the CNT agglomerate 117 and/or CNT compact 150 extracted from the CNT dispersion 100 with another material and use as a composition. A composition which includes the CNT agglomerate 117 of the present invention and/or the CNT compact 150 or CNT dispersion 100 can be used as a composition having excellent conduction or excellent strength or excellent thermal conduction or excellent conduction and strength. Here, another material is a resin, metal, glass, ion liquid or rubber for example. In addition, another material may also be an adhesive, cement, plaster or ceramic. These materials can be used alone or two or more can be used in combination.

In the present specification, dispersion refers to a state in which CNTs are scattered within the materials described above. A state in which CNTs are unraveled one by one or a state in which the CNTs are entwined in a bundle or where bundles having various thicknesses are mixed together but scattered within the material are also expressed as dispersed CNTs.

The contained amount of CNTs in a composition depends on the type of material other than the CNTs. However, it possible to favorably contain 0.01% by weight or more and 20% by weight or less within the composition and more preferably 0.01% by weight or more and 10% by weight or less and still more preferably 0.01% by weight or more and 5% by weight or less and among these 0.05% by weight or more and 1% by weight or less is more preferable. Although depending on purpose, if too many CNTs are contained in the composition, the strength of the composition sometimes decreases.

Although there is no particular limitation to the resin which can be used as long as it can be mixed or dispersed with CNTs, it is possible to use a natural resin or synthetic resin. In addition, a thermosetting resin and a thermoplastic resin can be favorably used as the synthetic resin. The mold of a thermoplastic resin has excellent impact strength and high molding press or injection molding efficiency and is therefore is preferred.

Although there is no particular limitation to the thermosetting resin, for example an unsaturated polyester resin, vinylester resin, epoxy resin, cyanate ester resin, benzoxazine resin, phenol (resol type) resin, urea melamine resin, thermosetting polyamide, a copolymer of these, a modified product, and two or more blended resins may also be used as the thermosetting resin.

Although there is no particular limitation to the thermoplastic resin, for example polyester, polyolefin, styrene group resin, polyoxymethylene, polyamide, polycarbonate, polymethylene methacrylate, polyvinyl chloride, polyphenylene sulfide, polyphenylene ether, polyimide, polyamide-imide, polyetherimide, polysulfone, polyether sulfone, polyketone, polyether ketone, polyether ether ketone, polyether ketone ketone, polyarylate, polyether nitrile, phenol (novolac type etc) resin, phenoxy resin, a fluorine group resin such as polytetrafluoroethylene, a thermoplastic such as a polystyrene series, polyolefin series, polyurethane series, polyester series, polyamide series, polybutadiene series, polyisoprene series, fluorine series etc, a copolymer or modified product of these and two or more blended resins may also be used as the thermoplastic resin.

Although there is no particular limitation to the metal which can be used as long as it can be mixed or dispersed with CNTs, it is possible to use aluminum, copper, silver, gold, iron, nickel, zinc, lead, tin, cobalt, chrome, titanium, tungsten in isolation or as a composite. Although there is no particular limitation to the glass which can be used as long as it can be mixed or dispersed with CNTs, it is possible to use soda-lime glass, lead glass or borosilicate glass etc.

There is no particular limitation to the rubber which is used in the CNT composition of the present invention and a natural rubber or synthetic rubber can be used. A versatile synthetic rubber such as emulsion polymerized styrene-butadiene rubber, solution polymerized styrene-butadiene rubber, high cys-1, 4-polybutadiene rubber, low cys-1, 4-polybutadiene rubber, high cys-1, 4-polyisoprene, a diene series special rubber such as nitrile rubber, hydrogenated nitrile rubber, chloroprene rubber etc, an olefin series special rubber such as ethylene-propylene rubber, butyl rubber, halogenated butyl rubber, acrylic rubber, chlorosulfonated polyethylene etc, and other special rubbers such as hydrin rubber, fluorine rubber, polysulfide rubber or urethane rubber can also be used as the synthetic rubber. Among these rubber components, a natural rubber and versatile rubber are preferred from the viewpoint of cost and characteristics. In addition, these rubber components can be used in isolation or two or more can be blended together.

EXAMPLES

Example 1

Examples of the CNT dispersion 100 and CNT compact 150 related to the present invention described above are explained in detail below. Furthermore, the examples are merely examples and the CNT dispersion 200 and CNT compact of the present invention are not limited to these examples.

The CNT bulk agglomerate 10 was manufactured using the manufacturing device described above and the same method using the CNT manufacturing device shown in FIG. 13 and FIG. 14. Referring to FIG. 13 and FIG. 14, a cylinder type silica tube (80 mm interior diameter) was used as the vertical type synthesis furnace 2030. The length of the heating means 2060 and the heated region 2070 was 265 mm. The substrate holder 2080 comprised from silica was arranged on the downflow 20 mm from a horizontal position of the center section. The substrate holder 2080 was arranged in a horizontal direction and a planar shaped substrate 2010 can be placed on the holder.

A 22 mm in diameter (20 mm interior diameter) gas supply pipe 2040 comprised from a heat resistant alloy was inserted in a vertical direction into an aperture arranged in the center of the upper wall of the synthesis furnace 2030, and a gas discharge pipe 2050 was inserted in a vertical direction in an aperture arranged in the center of the lower wall of the synthesis furnace 2030. A heating means 2060 comprised from a heat resistance coil arranged on the exterior periphery of the synthesis furnace 2030 and a heat temperature adjustment means was arranged, and a heated region 2070 heated to a certain temperature was set within the synthesis furnace 2030 (the total length of the heating means 2060 was 265 mm and the length of the heated region 2070 was 265 mm).

A gas flow formation means 2210 comprised from a heat resistant Inconel alloy which forms a 60 mm diameter cylinder shaped flat hollow structure was arranged to connect and link with an end of the gas supply pipe 2040 within the synthesis furnace 2030. The gas supply pipe 2040 was linked and connected to the center of the gas flow formation means 2210.

The gas flow formation means 2210 was placed in plane roughly parallel to the surface of the substrate 2010 and the center of the substrate 2010 was arranged to match the center of the gas flow formation means 2210. In addition, a gas injection means 2220 comprised of a plurality of 0.5 mm diameter injection holes was arranged on the gas flow formation means 2210. The gas flow formation means 2210 has a cylinder shape with a hollow structure and a surface size of 60.0 mm×16.7 mm and the diameter of the gas injection means 2200 was 0.5 mm and the number of gas injection means 2200 was 82.

The injection holes of the gas injection means 2200 was arranged in a position approaching the catalyst layer 2020 and a source gas was discharged at the catalyst from a roughly perpendicular direction to the plane of the substrate 2010. An approaching position refers to arrangement wherein the angle of the injection axis of the injection hole with respect to the normal line of the substrate was 0 or more and less than 90°. The distance between the gas injection means 2200 and the surface of the catalyst facing the gas injection means 2200 was 140 mm.

In this way, the source gas supplied to the synthesis furnace 2030 in drops from the gas supply pipe 2040 diffused and distributed within the synthesis furnace 2030 and after forming a source gas flow in a 360° direction roughly parallel to the plane of the substrate 2010, the source gas contacted with the surface of the catalyst layer 2020 on the substrate 2010 from a roughly perpendicular direction to the plane of the substrate 2010.

Here, a distance of 140 mm was intentionally arranged between the gas flow formation means 2210, the gas injection means 2200 and the catalyst surface, the heated volume was increased and a staying time period adjustment means 2140 was arranged in the space of the heated volume 2150. The staying time period adjustment means 2140 is arranged with two flow correcting plates comprised from a heat resistant Inconel alloy 600 which forms a turbulence prevention means 2200 connected to the gas flow formation means 2210 arranged with 8 φ4 mm holes on the first layer and 101 φ0.5 mm holes on the second layer. The distance 140 mm between the gas flow formation means 2210, the gas injection means 2200 and the catalyst surface is defined as the length of the staying time period adjustment means 2140. In this device, the length of the staying time period adjustment means 2140 matches the distance with the gas injection means 2200 arranged on the gas flow formation means 2210 arranged facing the surface of the catalyst.

A carbon weight flux adjustment means 2130 is formed by a source gas cylinder 2090 for a carbon compound which becomes the source material of CNT and if necessary, a catalyst activator material cylinder 2100, an atmosphere gas cylinder 2110 for a source gas or catalyst activator material carrier gas, and a reduction gas cylinder 2120 for reducing a catalyst are each connected to a gas flow device, and the amount of source has is controlled by supplying the source gas to the gas supply pipe 2040 while independently controlling the amount of gas supplied by each cylinder.

A Si substrate (height 40 mm×width 40 mm) with a 500 nm thermal oxide film sputtered with 30 nm of $Al_2O_3$ and 1.8 nm of Fe which is the catalyst was used as the substrate 2010.

The substrate 2010 was transferred (transfer process) onto the substrate holder 2080 arranged 20 mm downflow from a horizontal position in the center of the heating region 2070 within the synthesis furnace 2030. The substrate was arranged in a horizontal direction. In this way, the catalyst on the substrate and the flow path of the source has intersects in a perpendicular direction and the source gas is efficiently supplied to the catalyst.

Next, the interior of the synthesis furnace 2030 set to a furnace pressure of $1.02\times10^5$ Pa was increased in temperature from room temperature to 810° C. over 15 minutes using the heating means 2060 while introducing a mixed gas (total flow amount: 2000 sccm) comprising 200 sccm of He and 1800 sccm of $H_2$ as a reduction gas, and the substrate attached with the analyst was further heated for 3 minutes while maintaining a temperature of 810° C. (formation process). In this way, the iron catalyst layer was reduced, conversion to micro particles suitable for growth of a single-walled CNT was encouraged and multiple nanometer sized catalyst particles were formed on an alumina layer.

Next, the temperature of the synthesis furnace 2030 with a furnace pressure of $1.02\times10^5$ Pa (air pressure) was set at 810° C. and a total flow amount of 2000 sccm comprising an atmosphere gas He:total flow amount ratio 84% (1680 sccm), $C_2H_4$ which is the source gas:total flow amount ratio 10% (200 sccm), and He (absolute moisture 23%) containing $H_2O$ as the catalyst activator material:total flow amount ratio 6% (120 sccm) was supplied so that the carbon weight flux became 192 $g/cm^2/min$ (growth process). The furnace staying time period was 7 seconds.

In this way, a single-walled CNT was grown from each catalyst micro particle (growth process) and an orientated CNT agglomerate was obtained. In this way, CNTs were grown on the substrate 2010 under a high carbon environment containing the catalyst activator material.

After the growth process, only the atmosphere gas (total flow amount 4000 sccm) is supplied for 3 minutes and the remaining gas and generated carbon impurities and catalyst activator agent are removed (carbon impurities attachment control process, flush process).

Following this, after cooling the substrate to 400° C. or less, the substrate is removed from the interior of the synthesis furnace 2030 (cooling, substrate removal process) and the manufacturing process of a series of CNT bulk agglomerates 10 is complete.

(Orientated CNT Agglomerate)

A plurality of CNTs grown simultaneously from the catalyst layer 2020 on the substrate 2010 are grown and orientated in a direction intersecting the catalyst later 2020 and a CNT bulk agglomerate 10 with a uniform height and high specific surface area and high purity is formed.

In the orientated CNT bulk agglomerate 10 synthesized by the method described above, CNT pairs appropriately wind together and can be easily peeled from the substrate in an agglomerate shape with an appropriate size without the CNTs becoming separated. Furthermore, the generation and attachment of carbon impurities to the CNT bulk agglomerate 10 are controlled and because appropriate gaps exist between CNTs, it is easy for CNTs to unwind and the level of dispersion is high. Furthermore, the CNTs have a high specific surface area. This type of CNT bulk agglomerate 10 is suitable for obtaining a stable CNT dispersion 100.

The orientated CNT agglomerate is sucked using a vacuum pump and peeled from the substrate and CNT agglomerates attached to a filter are gathered. At this time, the orientated CNT agglomerate is dispersed and a clump shape CNT agglomerate is obtained.

Next, the CNT agglomerate is placed on one net with 0.8 mm apertures and sucked via the net using a vacuum cleaner, the product which passes through is gathered, and categorized except for the clump shaped CNT agglomerates with a large size (categorization process).

The CNT agglomerate was measured using a Carl Fisher reaction method (Coulometric titration method trace moisture measurement device CA-200 manufactured by Mitsubishi Chemical Analytics). After drying the CNT agglomerate under certain conditions (under a vacuum for 1 hour at 200° C.), the vacuum is removed and about 30 mg of the CNTs are extracted in the glove box of a dry nitrogen gas current and the CNT agglomerate 117 is moved to a glass boat of a moisture meter. The glass boat is moved to an aerification device, heated for 2 minutes at 150° C. and the aerated water component during this time is transferred by the nitrogen gas and reacts with iodine due to the Carl Fisher reaction. At this time, the amount of water component is detected by the amount of electricity required for generating the same amount of iodine that was consumed. The CNT agglomerate 117 before drying has a water component of 0.8% by weight according to this method. The CNT agglomerate 117 after drying has a reduced water component of 0.3% by weight.

100 mg of the CNT agglomerate classified from the CNT agglomerate 117 was precisely weighed, introduced to a 100 ml flask (three holes: vacuum type, temperature adjustment type), held for 1 hour when the temperature reached 200° C. under a vacuum and dried. After drying was completed, the flask was heated and while in a vacuum process state, 20 ml of a dispersion medium MIBK (manufactured by Sigma-Aldrich Japan) was introduced to the flask and the CNT agglomerate 117 was prevented from contact with air (drying process).

Furthermore, the MIBK (manufactured by Sigma-Aldrich Japan) was increased to 300 ml. An octangular rotor was put in the beaker, the beaker was sealed with aluminum foil and a pre-dispersion process was performed by stirring the beaker for 24 hours using a stirrer at 800 RPM ensuring that the MIBK did not vaporize. This pre-dispersion process is favorably in order to obtain a CNT dispersion including a CNT agglomerate having the mesh body of the present invention. Furthermore, using an octangular rotor in the pre-dispersion process is favorable for unraveling the CNT agglomerate and obtaining the results of the present invention.

In the dispersion process, the CNT agglomerate was passed through a 200 µm flow path using a wet type jet mill (nano-jet mill (Registered Trademark) JN10 manufactured by JOKOH) under a pressure of 60 MPa, the agglomerate was dispersed in MIBK and a CNT dispersion 100 was obtained with a weight concentration of 0.033% wt.

The dispersion was again stirred using the stirrer at a normal temperature for 24 hours. At this time, a lid was not put on the beaker and the MIBK was vaporized using a solvent leaving around 150 ml. The weight concentration of CNTs at this time was around 0.075% wt (dispersion process). The CNT dispersion 100 related to the present invention was obtained in this way.

(CNT Agglomerate Including a Mesh Body)

The CNT dispersion 100 with a weight concentration of 0.075% by weight processed under 60 MPa was coated very thinly on a silicon or glass substrate by spin coating (MIKASA SPINCOATER 1H-D7).

First, about 1 ml of the CNT dispersion 100 to be coated was prepared. The substrate (silicon in the case of a SEM observation, slide glass in the case of an optical microscope) to be coated with the sample was prepared. The substrate was fixed by a vacuum. The rotation conditions were 3000 RPM×30 seconds and about 0.1 ml of a solvent was dripped onto the center of the substrate and spin coated. In the case of a problem with the CNT agglomerate 117 etc on the substrate, the number of rotations cold be changed and finely adjusted.

Figure 2:
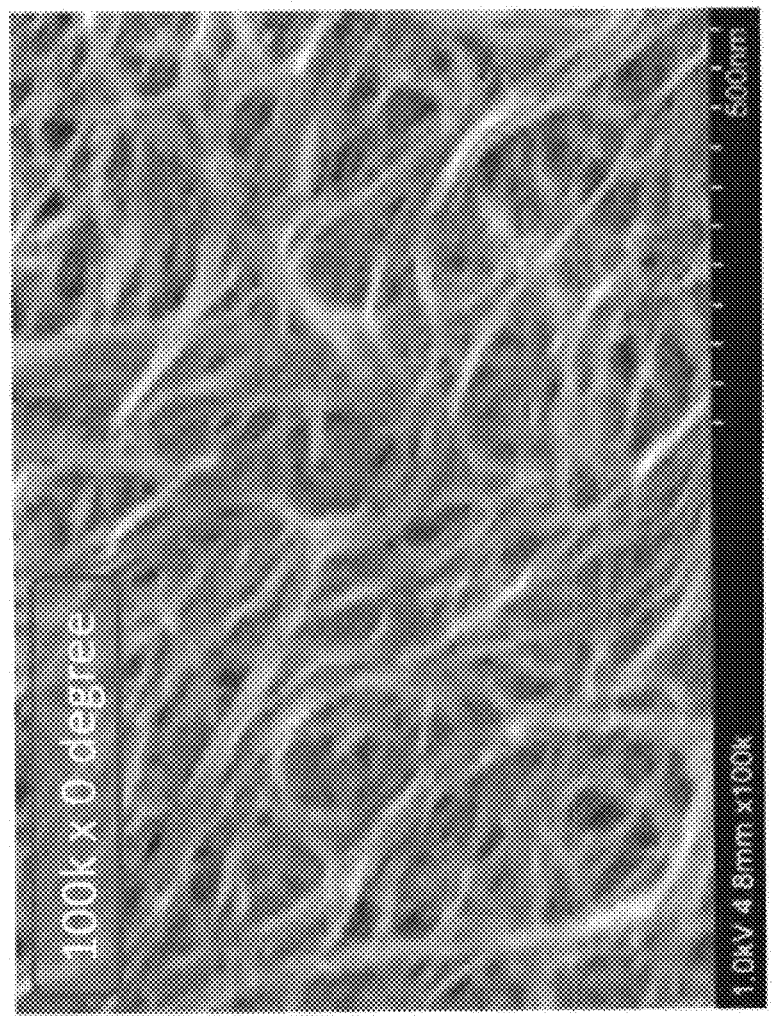
FIG. 2 is a scanning electron microscope (SEM) image of a mesh body 113 related to one embodiment of the present invention.
Figure 3:
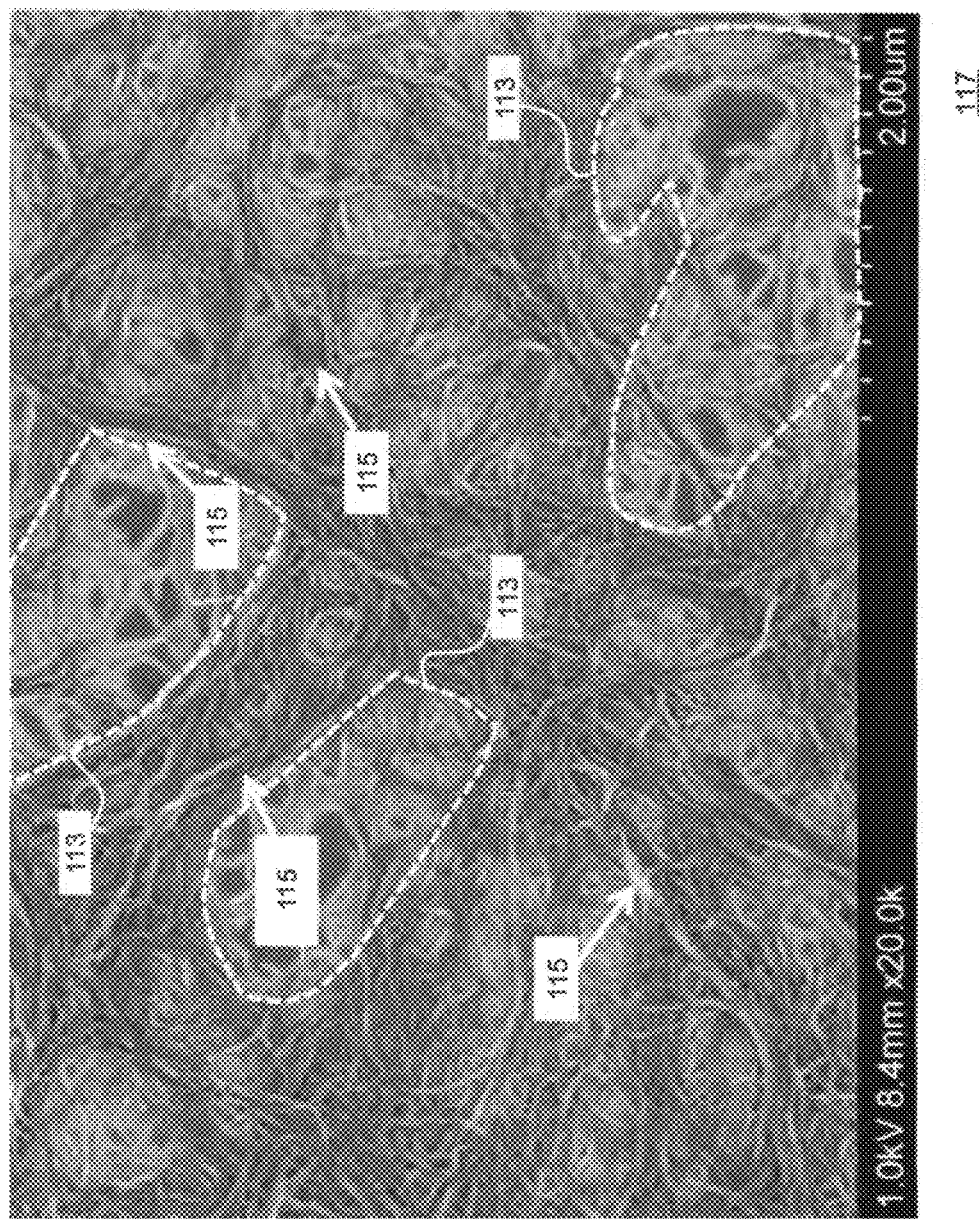
FIG. 3 is a SEM image of a CNT agglomerate 117 including the mesh body 113 and a trunk section 115 related to one embodiment of the present invention.

Next, the created sample was observed using a scanning electron microscope, an optical microscope and a laser microscope. FIG. 15 to FIG. 18 show a scanning electron microscope of the CNT agglomerate 117 comprised from a plurality of CNTs. From this observation, it is clear that the CNT dispersion 100 includes a CNT agglomerate 117 comprised from a plurality of CNTs. FIG. 2 and FIG. 3 and expanded scanning electron microscope views of the CNT agglomerate 117. It is clear that the CNT agglomerate 117 has CNTs (or CNT bundles) having fine pores (gaps) and a CNT (or CNT bundles) network structure, that is, the mesh body 113.

It is clear from FIG. 4, FIG. 5 and FIG. 6 that the CNT dispersion includes the CNT agglomerate 117 with a trunk section 115. It is also clear from FIG. 7 that the CNT dispersion 100 includes a CNT group 110 comprised from a plurality of CNT agglomerates 117 connected by a connection part 120. It is also clear from FIG. 8, FIG. 9 and FIG. 10 that the CNT dispersion 100 includes a connection part 120 arranged with the trunk section 115 and mesh body 113, and a CNT agglomerate 117 arranged with the trunk section 115 extending to the connection part 120.

(Size of the CNT Agglomerate

Next the surface of the created sample was observed at 200 magnification, a 1 µm or more surface area of the CNT agglomerate 117 randomly extracted was analyzed using public domain image processing software (image J), and the size of the CNT agglomerate 117 was calculated by calculating the two dimensional surface area. The size of 100 CNT agglomerates 117 randomly extracted was calculated and the average value is given as the size of the CNT agglomerate 117. The average distribution size of a CNT agglomerate 117 within the CNT dispersion 100 with a weight concentration of 0.075% by weight processed under 60 MPa was 9135 µm².

(Single-Walled CNT)

A few drops of the CNT dispersion was dropped onto a grid and dried. This grid coated with the sample was placed in a TEM (JEM-2100 manufactured by Nihon Denshi) and observed. The measurement magnification was from 50,000 to 500,000. The acceleration voltage was 120 kV. A single-walled CNT was observed with no carbon impurities attached. In addition, 98% or more (98 pieces) among the 100 CNTs were taken up by single-walled CNTs.

(Viscosity of the CNT Dispersion)

The viscosity of the CNT dispersion 100 in Example 1 described above was measured at a shear speed of 10/seconds at 25° C. using a digital rotating viscometer (DV-I PRIME manufactured by Brookfield). About 1 ml of the CNT dispersion 100 was placed in a flat bottom container and set in order to join with a spindle. At this time, the end (center) of the spindle was point contacted with the bottom of the container. From this position, the spindle was moved one part in a vertical direction (0.013 mm release direction) and the shear rate was made easy to convert. The rotation speed was adjusted and the viscosity was read. The viscosity of the CNT dispersion 100 at the time was 74 mPa·s.

(Particle Size Distribution of the CNT Agglomerate)

The CNT dispersion 100 in Example 1 was measured using a solvent using a laser diffraction device (Microtrac particle size distribution measuring device MT-300011 manufactured by Nikkiso). In a range of 1 μm 1000 μm, the particle size distribution of the obtained CNT agglomerate was in a range of 3.6 μm 418.6 μm and the particle diameter (median diameter) of an accumulation of 50% was 36.7 μm.

(Dispersion Stability of the CNT Dispersion)

The CNT dispersion 200 visually maintained dispersion without the CNT agglomerate 117 and the solvent separating even after being left for 10 days or more. It is clear that the CNT dispersion of the present example has a very high level of stability.

(Evaluation of the CNT Agglomerate and CNT Compact)

A thin film CNT compact 250 was manufactured in order to extract the CNT agglomerate 117 from the CNT dispersion described above and evaluate its properties. A Millipore filter (Filter Membrane: DURAPORE (Registered Trademark) (0.22 μm GV, diameter 45 mm) manufactured by MILLIPORE) was set into a container which can be vacuumed, and 0.075% by weight of the CNT dispersion 200 was filtered using 150 ml of the Millipore filter. The CNT agglomerate 117 was deposited on the Millipore filter and a thin film CNT compact 250 was formed with a thickness of around 70 μm. The CNTs deposited on the Millipore filter were sandwiched between two pieces of filter paper and vacuum dried at 70° C. for 12 hours. After drying, the thin film CNT compact 250 was easily peeled from the Millipore filter and a desired CNT compact was obtained.

(Pore Diameter and Pore Volume of the CNT Agglomerate)

The pore distribution of about 100 mg of the manufactured CNT compact 250 was evaluated using a mercury intrusion porosimeter (Micrometrics Automatic porosimeter Autopore IV9500 manufactured by Shimadzu Corporation). The pore size had a maximum differential pore volume in a pore size range of 0.002 m or more and 10.00 μm or less was 0.045 μm, and the pore volume at a pore size had a maximum differential pore volume of 1.09 mL/g.

(Pore Diameter and Pore Volume of the CNT Agglomerate)

About 1 mg of the manufactured CNT compact 250 was placed in a differential thermal analyzer ((model number Q5000IR) manufactured by TA Instruments) and the temperature was increased from room temperature to 900° C. at a speed of 1° C. per minute in air. The weight reduction from 200° C. to 400° C. was 0.7%. In addition, the largest peak of the DTA curve at this time was 669° C.

A 50 mg clump was extracted from the manufactured CNT compact 250 and an adsorption isotherm of liquid nitrogen (the adsorption average time was 600 seconds) was measured using a BELSORP-MINI (manufactured by Nihon Bell). The relative surface was measured at 1000 m²/g using the Brunauer, Emmett, Teller method from this adsorption isotherm. In addition, a 50 mg clump extracted from the CNT compact 250 was placed evenly on an aluminum tray and inserted into a muffle furnace. The temperature was increase to 550° C. at a speed of 1° C. per minute, and the weight of the sample became 45 mg when a heating process was performed for 1 minute under an oxygen atmosphere (20% concentration) with 5 mg being burned. The specific surface area of the sample after the heating process was measured at around 1900 m²/g using the process described above.

(Conductivity of the CNT Compact)

The surface resistance value of the CNT compact 250 was measured in a Loresta EP MCP-T360 (manufactured by Dai Instruments Co. Ltd) using a JISK7419 standard 4 terminal 4 point probe method. After the obtained surface resistance value was measured using the 4 terminal method, the volume resistance value was calculated by applying the film thickness of the compact and the surface resistance value. The conductivity of the compact was calculated at 83 S/cm from the volume resistance value.

(CNT Rubber Composition)

A matrix solution with fluorine rubber (Daiel-G912 manufactured by Daikin Industries) dissolved in MIBK was prepared then added to the CNT dispersion 100 with a process pressure of 60 MPa using a wet type jet mill, sufficiently stirred and the CNTs were dispersed into the matrix. 150 ml of the CNT dispersion was added to 50 ml of the fluorine rubber solution so that the contained amount of CNTs became 1% in the case where the mass of the entire CNT compound material is set at 100% mass, stirred for 16 hours at room temperature under a condition of 300 rpm using a stirrer and condensed until the total amount became about 50 ml. By pouring the sufficiently mixed solution into a petri dish and drying at room temperature for 12 hours, the CNT compound material hardened. The hardened CNT compound material was inserted into a vacuum drying furnace at 80° C., dried and the solution was removed. In this way, a 1% by weight CNT rubber was obtained. The conductivity of the obtained CNT rubber was 0.5 S/cm which is very high regardless of the small amount of CNTs added.

(CNT Rubber Composition)

Bisphenol F epoxy resin and aromatic amine cure agent (JER806 (registered trademark), JECURE (registered trademark) W manufactured by Mitsubishi Resin Co. Ltd) were mixed in a weight ratio of 3.5:1 at room temperature and an epoxy resin solution dissolved with acetone was prepared. After replacing the solvent MIBK of the CNT dispersion 100 with a process pressure of 60 MPa using a wet type jet mill with acetone it was added to the epoxy resin acetone solution and sufficiently stirred. 150 ml of the CNT dispersion was added to 50 ml of the epoxy resin solution so that the contained amount of CNTs became 10% in the case where the mass of the entire CNT compound material is set at 100% mass. The acetone was removed by vaporization at 40° C. using a rotary evaporator from the CNT epoxy resin acetone solvent. The obtained CNT epoxy resin solution was coated on to a Teflon (registered trademark) sheet, cured for 2.5 hours at 100° C. using a hot press, completely cured over 4 hours at 175° C. and a 10% by weight CNT epoxy resin was obtained.

Example 2

A CNT dispersion 300 was manufactured the same as in Example 1. However, the process pressure using a wet type jet mill was set at 20 MPa. The manufactured product which was obtained was measured in the same manner as Example 1. The weight concentration of CNTs within the CNT dispersion 300 was 0.075% by weight. The CNT dispersion 300 included a CNT agglomerate 117 having a trunk section 115 the same as in Example 1. In addition, the CNT dispersion 300 included a CNT group 110 comprised from a plurality of CNT agglomerates 117 connected by a connection part 120 the same as in Example 1. The CNT dispersion 300 also included a connection part 120 arranged with the trunk section 115 and mesh body 113, and a CNT agglomerate 117 arranged with the trunk section 115 extending to the connection part 120 the same as in Example 1.
(CNT Agglomerate Size)

The average distribution size of the CNT agglomerate 117 within the CNT dispersion 300 was 200 $\mu m^2$.
(Single-Walled CNT)

99 out of 100 CNTs were made up by single-walled CNTs.
(Viscosity of the CNT Dispersion)

The viscosity of the CNT dispersion 300 measured with a shear rate of 10/seconds at 25° C. was 154 mPa·s. The accumulation 50% particle size (median diameter) was 200 μm evaluated using the method in Example 1.
(Dispersion Stability of the CNT Dispersion)

The CNT dispersion 300 visually maintained dispersion without the CNT agglomerate 117 and the solvent separating even after being left for 10 days or more. It is clear that the CNT dispersion of the present example has a very high level of stability.
(Evaluation of the CNT Agglomerate and CNT Compact)

The pore size of 100 mg of the CNT compact 350 had a maximum differential pore volume in a pore size range of 0.002 μm or more and 10.00 μm or less was 0.068 μm, and the pore volume at a pore size had a maximum differential pore volume of 0.95 mL/g.

The weight reduction from 200° C. to 400° C. was 0.9%. In addition, the largest peak of the DTA curve at this time was 660° C.

The relative surface was measured at 950 $m^2/g$ using the Brunauer, Emmett, Teller method from an adsorption isotherm.

Conductivity of the CNT compact 350 was 68 S/cm.

Example 3

A CNT dispersion 400 was manufactured the same as in Example 1. However, the process pressure using a wet type jet mill was set at 120 MPa. The manufactured product which was obtained was measured in the same manner as Example 1. The weight concentration of CNTs within the CNT dispersion 400 was 0.074% by weight. The CNT dispersion 400 included a CNT agglomerate 117 having a trunk section 115 the same as in Example 1. In addition, the CNT dispersion 400 included a CNT group 110 comprised from a plurality of CNT agglomerates 117 connected by a connection part 120 the same as in Example 1. The CNT dispersion 400 also included a connection part 120 arranged with the trunk section 115 and mesh body 113, and a CNT agglomerate 117 arranged with the trunk section 115 extending to the connection part 120 the same as in Example 1.
(CNT Agglomerate Size)

The average distribution size of the CNT agglomerate 117 within the CNT dispersion 400 was 2954 $\mu m^2$.
(Single-Walled CNT)

97 out of 100 CNTs were made up by single-walled CNTs.
(Viscosity of the CNT Dispersion)

The viscosity of the CNT dispersion 400 measured with a shear rate of 10/seconds at 25° C. was 120 mPa·s.
(Dispersion Stability of the CNT Dispersion)

The CNT dispersion 400 visually maintained dispersion without the CNT agglomerate 117 and the solvent separating even after being left for 10 days or more. It is clear that the CNT dispersion of the present example has a very high level of stability. The accumulation 50% particle size (median diameter) was 25.2 μm evaluated using the method in Example 1.
(Evaluation of the CNT Agglomerate and CNT Compact)

The pore size of 100 mg of the CNT compact 450 had a maximum differential pore volume in a pore size range of 0.002 μm or more and 10.00 μm or less was 0.045 μm, and the pore volume at a pore size had a maximum differential pore volume of 1.1 mL/g.

The weight reduction from 200° C. to 400° C. was 0.6%. In addition, the largest peak of the DTA curve at this time was 678° C.

The relative surface was measured at 1050 $m^2/g$ using the Brunauer, Emmett, Teller method from an adsorption isotherm.

Conductivity of the CNT compact 450 was 70 S/cm.

Example 4

A CNT dispersion 500 was manufactured the same as in Example 1. However, the CNT dispersion 500 was obtained with a weight concentration of CNTs of 0.03% by weight by changing the added amount of MIBK used in Example 1. The CNT dispersion 500 included a CNT agglomerate 117 having a trunk section 115 the same as in Example 1. In addition, the CNT dispersion 500 included a CNT group 110 comprised from a plurality of CNT agglomerates 117 connected by a connection part 120 the same as in Example 1. The CNT dispersion 500 also included a connection part 120 arranged with the trunk section 115 and mesh body 113, and a CNT agglomerate 117 arranged with the trunk section 115 extending to the connection part 120 the same as in Example 1.
(CNT Agglomerate Size)

The average distribution size of the CNT agglomerate 117 within the CNT dispersion 500 was 8475 $\mu m^2$.
(Single-Walled CNT)

98 out of 100 CNTs were made up by single-walled CNTs.
(Viscosity of the CNT Dispersion)

The viscosity of the CNT dispersion 500 measured with a shear rate of 10/seconds at 25° C. was 15 mPa·s.
(Dispersion Stability of the CNT Dispersion)

The CNT dispersion 500 visually maintained dispersion without the CNT agglomerate 117 and the solvent separating even after being left for 10 days or more. It is clear that the CNT dispersion 500 of the present example has a very high level of stability. The accumulation 50% particle size (median diameter) was 30.4 μm evaluated using the method in Example 1.
(Evaluation of the CNT Agglomerate and CNT Compact)

The pore size of 100 mg of the CNT compact 550 had a maximum differential pore volume in a pore size range of 0.002 μm or more and 10.00 μm or less was 0.05 μm, and the pore volume at a pore size had a maximum differential pore volume of 1.05 mL/g.

The weight reduction from 200° C. to 400° C. was 0.7%. In addition, the largest peak of the DTA curve at this time was 660° C.

The relative surface was measured at 1000 m²/g using the Brunauer, Emmett, Teller method from an adsorption isotherm.

Conductivity of the CNT compact 550 was 81 S/cm.

Example 5

A CNT dispersion 600 was manufactured the same as in Example 1. However, the CNT dispersion 600 was obtained with a weight concentration of CNTs of 0.15% by weight by changing the added amount of MIBK used in Example 1. The CNT dispersion 600 included a CNT agglomerate 117 having a trunk section 115 the same as in Example 1. In addition, the CNT dispersion 600 included a CNT group 110 comprised from a plurality of CNT agglomerates 117 connected by a connection part 120 the same as in Example 1. The CNT dispersion 600 also included a connection part 120 arranged with the trunk section 115 and mesh body 113, and a CNT agglomerate 117 arranged with the trunk section 115 extending to the connection part 120 the same as in Example 1.

(CNT Agglomerate Size)

The average distribution size of the CNT agglomerate 117 within the CNT dispersion 600 was 9325 μm².

(Single-Walled CNT)

98 out of 100 CNTs were made up by single-walled CNTs.

(Viscosity of the CNT Dispersion)

The viscosity of the CNT dispersion 600 measured with a shear rate of 10/seconds at 25° C. was 353 mPa·s.

(Dispersion Stability of the CNT Dispersion)

The CNT dispersion 600 visually maintained dispersion without the CNT agglomerate 117 and the solvent separating even after being left for 10 days or more. It is clear that the CNT dispersion 600 of the present example has a very high level of stability. The accumulation 50% particle size (median diameter) was 40.2 μm evaluated using the method in Example 1.

(Evaluation of the CNT Agglomerate and CNT Compact)

The pore size of 100 mg of the CNT compact 650 had a maximum differential pore volume in a pore size range of 0.002 μm or more and 10.00 μm or less was 0.04 μm, and the pore volume at a pore size had a maximum differential pore volume of 1.2 mL/g.

The weight reduction from 200° C. to 400° C. was 0.7%. In addition, the largest peak of the DTA curve at this time was 660° C.

The relative surface was measured at 1000 m²/g using the Brunauer, Emmett, Teller method from an adsorption isotherm.

Conductivity of the CNT compact 650 was 79 S/cm.

Example 6

Figure 19:
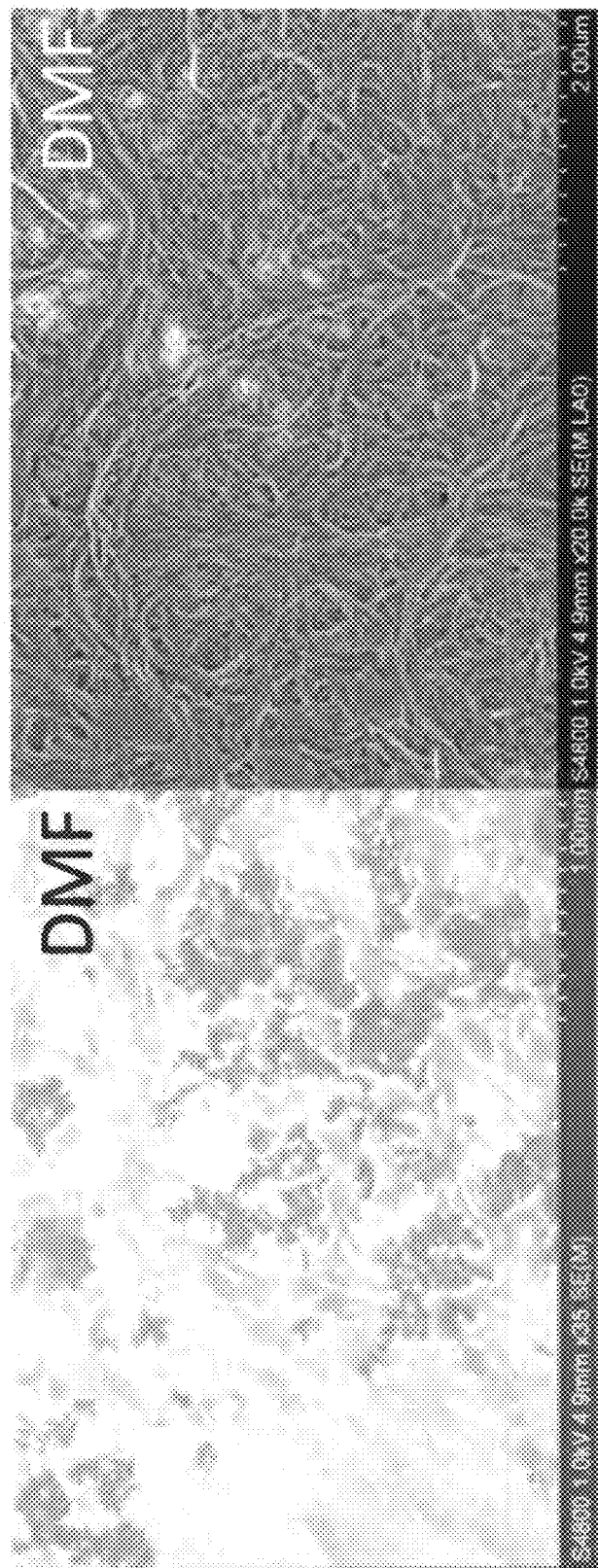
FIG. 19 is a SEM image of a CNT group 710 related to one embodiment of the present invention, the left diagram is a SEM image of the CNT group 710, the right diagram is a SEM of the CNT agglomerate 717.

A CNT dispersion 700 was manufactured the same as in Example 1. However, the CNT dispersion 700 was obtained with a weight concentration of CNTs of 0.071% by weight by using N, N-dimethylformamide (DMF) as a dispersion medium instead of MIBK used in Example 1. As shown in FIG. 19, the CNT dispersion 700 included a CNT agglomerate 717 having a trunk section 115 the same as in Example 1. In addition, the CNT dispersion 700 included a CNT group 710 comprised from a plurality of CNT agglomerates 717 connected by a connection part 120 the same as in Example 1. The CNT dispersion 700 also included a connection part 120 arranged with the trunk section 115 and mesh body 113, and a CNT agglomerate 117 arranged with the trunk section 115 extending to the connection part 120 the same as in Example 1.

(CNT Agglomerate Size)

The average distribution size of the CNT agglomerate 717 within the CNT dispersion 700 was 11950 μm².

(Single-Walled CNT)

97 out of 100 CNTs were made up by single-walled CNTs.

(Viscosity of the CNT Dispersion)

The viscosity of the CNT dispersion 700 measured with a shear rate of 10/seconds at 25° C. was 238 mPa·s.

(Dispersion Stability of the CNT Dispersion)

The CNT dispersion 700 visually maintained dispersion without the CNT agglomerate 717 and the solvent separating even after being left for 10 days or more. It is clear that the CNT dispersion 700 of the present example has a very high level of stability. The accumulation 50% particle size (median diameter) was 19 μm evaluated using the method in Example 1.

(Evaluation of the CNT Agglomerate and CNT Compact)

The pore size of about 100 mg of the CNT compact 750 had a maximum differential pore volume in a pore size range of 0.002 μm or more and 10.00 μm or less was 0.050 μm, and the pore volume at a pore size had a maximum differential pore volume of 1.15 mL/g.

The weight reduction from 200° C. to 400° C. was 0.8%. In addition, the largest peak of the DTA curve at this time was 652° C.

The relative surface was measured at 1000 m²/g using the Brunauer, Emmett, Teller method from an adsorption isotherm.

Conductivity of the CNT compact 750 was 50 S/cm.

Example 7

Figure 20:
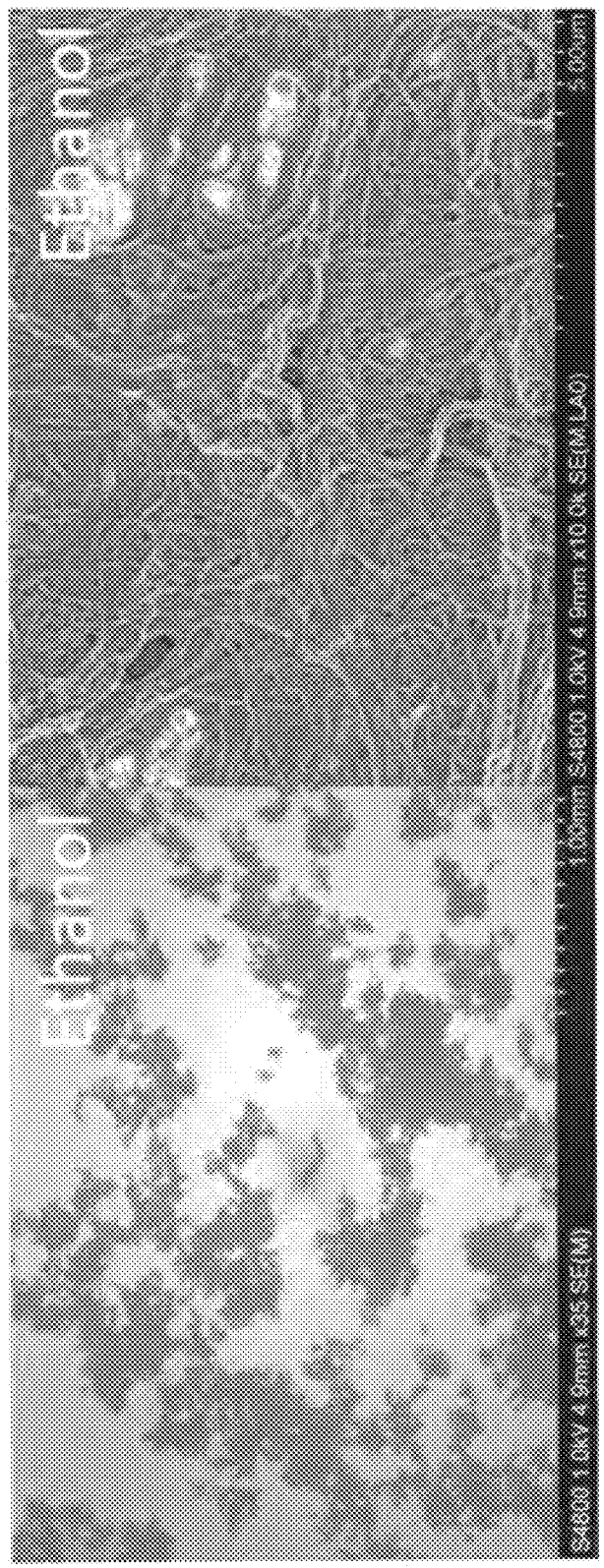
FIG. 20 is a SEM image of a CNT group 810 related to one embodiment of the present invention, the left diagram is a SEM image of the CNT group 810, the right diagram is a SEM of the CNT agglomerate 817.

A CNT dispersion 800 was manufactured the same as in Example 1. However, the CNT dispersion 800 was obtained with a weight concentration of CNTs of 0.074% by weight by using ethanol as a dispersion medium instead of MIBK used in Example 1. As shown in FIG. 20, the CNT dispersion 800 included a CNT agglomerate 817 having a trunk section 115 the same as in Example 1. In addition, the CNT dispersion 800 included a CNT group 810 comprised from a plurality of CNT agglomerates 817 connected by a connection part 120 the same as in Example 1. The CNT dispersion 800 also included a connection part 120 arranged with the trunk section 115 and mesh body 113, and a CNT agglomerate 817 arranged with the trunk section 115 extending to the connection part 120 the same as in Example 1.

(CNT Agglomerate Size)

The average distribution size of the CNT agglomerate 817 within the CNT dispersion 800 was 15398 μm².

(Single-Walled CNT)

98 out of 100 CNTs were made up by single-walled CNTs.

(Viscosity of the CNT Dispersion)

The viscosity of the CNT dispersion 800 measured with a shear rate of 10/seconds at 25° C. was 163 mPa·s.

(Dispersion Stability of the CNT Dispersion)

The CNT dispersion 800 visually maintained dispersion without the CNT agglomerate 817 and the solvent separating even after being left for 10 days or more. It is clear that the CNT dispersion 800 of the present example has a very high level of stability. The accumulation 50% particle size (median diameter) was 53.4 μm evaluated using the method in Example 1.

(Evaluation of the CNT Agglomerate and CNT Compact)

The pore size of about 100 mg of the CNT compact 850 had a maximum differential pore volume in a pore size range of 0.002 μm or more and 10.00 μm or less was 0.06 μm, and the pore volume at a pore size had a maximum differential pore volume of 1.0 mL/g.

The weight reduction from 200° C. to 400° C. was 0.8%. In addition, the largest peak of the DTA curve at this time was 659° C.

The relative surface was measured at 1000 m$^2$/g using the Brunauer, Emmett, Teller method from an adsorption isotherm.

Conductivity of the CNT compact was 46 S/cm.

Example 8

Figure 21:
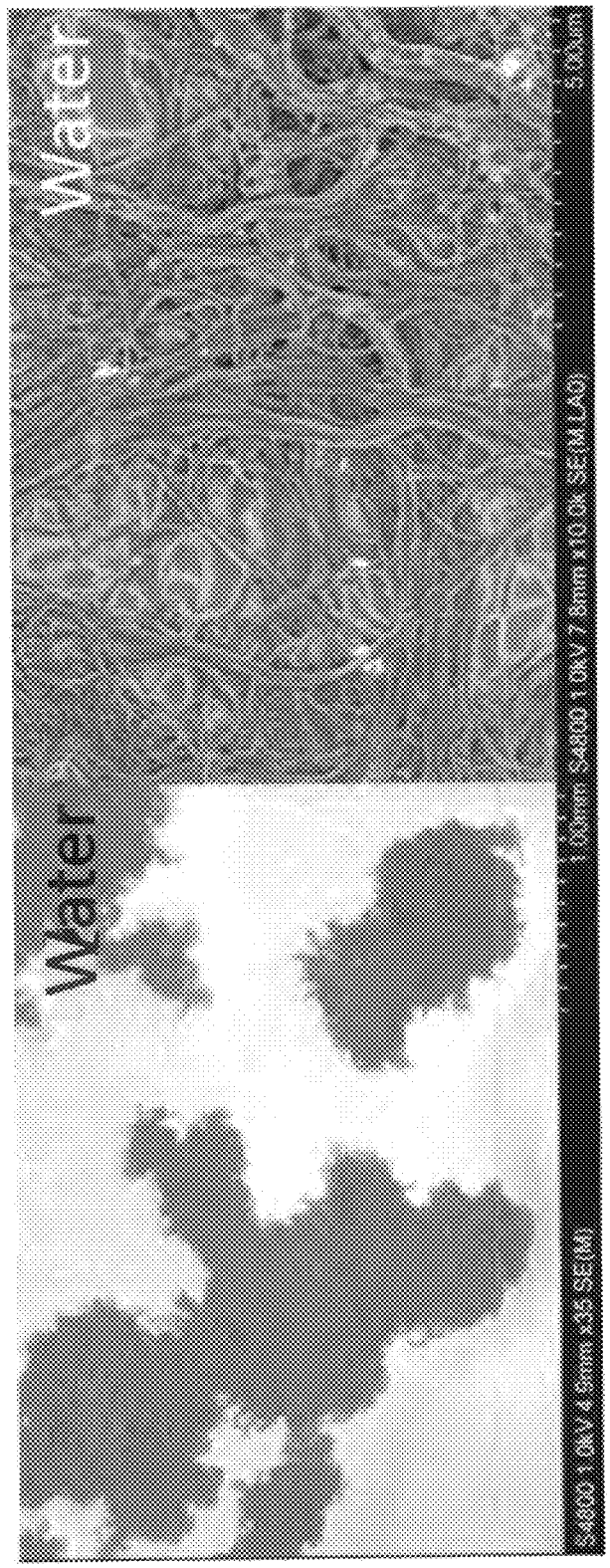
FIG. 21 is a SEM image of a CNT group 910 related to one embodiment of the present invention, the left diagram is a SEM image of the CNT group 910, the right diagram is a SEM of the CNT agglomerate 917.

A CNT dispersion 900 was manufactured the same as in Example 1. However, the CNT dispersion 900 was obtained with a weight concentration of CNTs of 0.059% by weight by using water as a dispersion medium instead of MIBK used in Example 1. As shown in FIG. 21, the CNT dispersion 900 included a CNT agglomerate 917 having a trunk section 115 the same as in Example 1. In addition, the CNT dispersion 900 included a CNT group 910 comprised from a plurality of CNT agglomerates 917 connected by a connection part 120 the same as in Example 1. The CNT dispersion 900 also included a connection part 120 arranged with the trunk section 115 and mesh body 113, and a CNT agglomerate 917 arranged with the trunk section 115 extending to the connection part 120 the same as in Example 1.

(CNT Agglomerate Size)

The average distribution size of the CNT agglomerate 917 within the CNT dispersion 900 was 28893 μm$^2$.

(Single-Walled CNT)

100 out of 100 CNTs were made up by single-walled CNTs.

(Viscosity of the CNT Dispersion)

The viscosity of the CNT dispersion 900 measured with a shear rate of 10/seconds at 25° C. was 610 mPa·s.

(Dispersion Stability of the CNT Dispersion)

The CNT dispersion 900 visually maintained dispersion without the CNT agglomerate 917 and the solvent separating even after being left for 10 days or more. It is clear that the CNT dispersion 900 of the present example has a very high level of stability. The accumulation 50% particle size (median diameter) was 155.9 μm evaluated using the method in Example 1.

(Evaluation of the CNT Agglomerate and CNT Compact)

The pore size of about 100 mg of the CNT compact 950 had a maximum differential pore volume in a pore size range of 0.002 μm or more and 10.00 μm or less was 0.065 μm, and the pore volume at a pore size had a maximum differential pore volume of 1.05 mL/g.

The weight reduction from 200° C. to 400° C. was 0.6%. In addition, the largest peak of the DTA curve at this time was 670° C.

The relative surface was measured at 1000 m$^2$/g using the Brunauer, Emmett, Teller method from an adsorption isotherm.

Conductivity of the CNT compact was 52 S/cm.

Comparative Example 1

100 mg of a single-walled CNT (known commonly as HiPco (high-pressure carbon monoxide process) manufactured by Unidyme was introduced to a 100 ml flask, maintained for 1 hour after reaching 200° C. under a vacuum and then dried. After drying, the flask was heated and while in a vacuum process state, 20 ml of a dispersion medium MIBK (manufactured by Sigma-Aldrich Japan) was introduced to the flask and the CNT agglomerate was prevented from contact with air (drying process). Furthermore, the MIBK (manufactured by Sigma-Aldrich Japan) was increased to 300 ml. An octangular rotor was put in the beaker, the beaker was sealed with aluminum foil and the beaker was stirred for 24 hours using a stirrer at 800 RPM ensuring that the MIBK did not vaporize. In the dispersion process, the CNT agglomerate was passed through a 200 μm flow path using a wet type jet mill (nano-jet mill (Registered Trademark) JN10 manufactured by JOKOH) under a pressure of 60 MPa, the agglomerate was dispersed in MIBK and a CNT dispersion 1000 was obtained with a weight concentration of 0.33% wt. The dispersion 1000 was again stirred using the stirrer at a normal temperature for 24 hours. At this time, a lid was not put on the beaker and the MIBK was vaporized using a solvent leaving around 150 ml. The weight concentration of CNTs at this time was around 0.075% wt (dispersion process).

In addition, a CNT dispersion 1000 was manufactured with a weight concentration of 0.15% by weight, 0.075% by weight and 0.03% by weight process under 60 MPa by changing the amount of MIBK added.

Although the CNT agglomerate included a mesh body, a trunk section and connection part were not observed. Viscosity of the CNT with a weight concentration of 0.15% by weight, 0.075% by weight and 0.03% by weight process under 60 MPa was measured using the method of Example 1 at 5.5, 3.3 and 0.8 mPa respectively.

In either case, when the CNT agglomerates were left to stand for 10 days, the CNT agglomerate and solvent separated and the dispersion stability was low compared to the CNT dispersion 100 in Example 1.

(Pore Diameter and Pore Volume of the CNT Agglomerate)

The pore distribution of 100 mg of a CNT compact was evaluated using the method of Example 1. A maximum differential pore volume in a pore size range of 0.01 μm or more and 10.00 μm or less was 0.019 μm, and the pore volume at a pore size had a maximum differential pore volume of 0.48 mL/g. The accumulation 50% particle size (median diameter) was 5.2 μm evaluated using the method in Example 1.

A thin film CNT compact 1050 was manufactured in order to evaluate the properties of the CNT agglomerate using the CNT dispersion 1000 in the Comparative Example described above.

The CNT compact 1050 was placed in a differential thermal analyzer ((model number Q5000IR) manufactured by TA Instruments) and the temperature was increased from room temperature to 900° C. at a speed of 1° C. per minute in air. The weight reduction from 200° C. to 400° C. was 14%. In addition, the largest peak of the DTA curve at this time was 484° C.

The specific surface area was measured at 600 m$^2$/g using the method of Example 1.

(Conductivity of the CNT Compact)

The conductivity of the CNT compact 1050 was measured at 25 S/cm using the method of Example 1 which was less compared to the conductivity measured in Example 1.

(CNT Rubber Composition)

A CNT rubber was manufactured using the method in Example 1 and its conductivity was measured at 0.0003

S/cm which was significantly less compared to the conductivity measured in Example 1.

Comparative Example 2

10 mg of a CNT using the manufacturing method of the present invention was introduced to MIBK, an ultrasonic process was conducted for 5 hours and a CNT dispersion with a CNT concentration of 0.001% by weight was obtained.

The CNT agglomerate of the present comparative example did not have CNTs (or CNT bundles) having fine pores (gaps) and a CNT (or CNT bundles) network structure, that is, it did not include a mesh body. In addition, a trunk section and connection part was not observed. When left for 10 days, the CNT agglomerate and the solvent separated and dispersion stability was low compared to the CNT dispersion of the present example.

(Pore Diameter and Pore Volume of the CNT Agglomerate)

The pore distribution of 100 mg of a CNT compact was evaluated using the method of Example 1. A maximum differential pore volume in a pore size range of 0.01 µm or more and 10.00 µm or less was 0.08 µm, and the pore volume at a pore size had a maximum differential pore volume of 1.1 mL/g. The accumulation 50% particle size (median diameter) was 5.5 µm evaluated using the method in Example 1.

A thin film CNT compact was manufactured using the method in Example 1 in order to evaluate the properties of the CNT agglomerate using the CNT dispersion in the Comparative Example described above.

The CNT compact was placed in a differential thermal analyzer ((model number Q5000IR) manufactured by TA Instruments) and the temperature was increased from room temperature to 900° C. at a speed of 1° C. per minute in air. The weight reduction from 200° C. to 400° C. was 1%. In addition, the largest peak of the DTA curve at this time was 650° C.

The specific surface area was measured at 900 m²/g using the method of Example 1.

(Conductivity of the CNT Compact)

The conductivity of the CNT compact was measured at 40 S/cm using the method of Example 1 which was less compared to the conductivity measured in the Examples.

(CNT Rubber Composition)

A CNT rubber was manufactured using the method in Example 1 and its conductivity was measured at 0.05 S/cm which was less compared to the conductivity measured in Example 1.

As explained above, the CNT dispersion related to the present invention maintained excellent electrical properties of a CNT, has high dispersion properties and high stability. In addition, a CNT compact is provided including excellent electrical properties by using the stable CNT dispersion having high dispersion properties related to the present invention.

According to the preset invention, a CNT dispersion, a CNT compact, a CNT composition, a CNT agglomerate and method of producing each are provided, the CNT dispersion being stable at a high concentration while maintaining excellent electrical properties, thermal conduction and mechanical properties and a high level of dispersion.

The invention claimed is:

1. A CNT dispersion comprising a dispersion medium and a plurality of CNT agglomerates dispersed in the dispersion medium, wherein a concentration of the CNT agglomerates dispersed in the dispersion medium is 0.001% by weight or more with respect to the total CNT dispersion, a 50% accumulation of a particle diameter, measured in a range of 1 µm or more in a particle distribution of the CNT agglomerates of the CNT dispersion measured using laser diffraction, is 10 µm or more and 1000 µm or less, a CNT agglomerate of the plurality of CNT agglomerates extracted from the CNT dispersion comprises a CNT network with a mesh structure, the mesh structure comprises a trunk section, the CNT network comprises a plurality of pores to impregnate the dispersion medium, and viscosity of the CNT dispersion at a shear rate of 10/seconds is 10 mPa·s (25° C.) or more and 5000 mPa·s (25° C.) or less, a pore diameter of the CNT agglomerate extracted from the CNT dispersion measured using a mercury intrusion porosimeter is distributed in a first range of 0.002 µm or more and 10.00 µm or less, the CNT agglomerate has a pore volume based on the pore diameter and a differential pore volume corresponding to the pore volume, the differential pore volume is at a maximum where the pore diameter is in a second range of 0.02 µm or more and 2.0 µm or less, and the pore volume where the pore diameter is in the second range is 0.5 mL/g or more.

2. The CNT dispersion according to claim 1, wherein the CNT agglomerates and the dispersion medium do not separate even after being left for 10 days.

3. The CNT dispersion according to claim 1, wherein a reduction in weight from 200° C. to 400° C. in a thermal weight measurement when the temperature of the CNT agglomerate extracted from the CNT dispersion is increased at 1° C. per minute is 10% or less.

4. The CNT dispersion according to claim 1, wherein the CNT agglomerate extracted from the CNT dispersion has a specific surface area of 800 m²/g or more and 2600 m²/g or less.

5. The CNT dispersion according to claim 1, wherein an average distribution size of the CNT agglomerate extracted from the CNT dispersion is 500 µm² or more and 50000 µm² or less.

6. A CNT composition comprising the CNT dispersion according to claim 1.

7. A CNT dispersion comprising a dispersion medium and a plurality of CNT agglomerates dispersed in the dispersion medium, wherein a concentration of the CNT agglomerates dispersed in the dispersion medium is 0.001% by weight or more with respect to the total CNT dispersion, a CNT agglomerate extracted from the CNT dispersion comprises a CNT network with a mesh structure, the mesh structure comprises a trunk section, the CNT network comprises a plurality of pores to impregnate the dispersion medium, viscosity of the CNT dispersion at a shear rate of 10/seconds is 10 mPa·s (25° C.) or more and 5000 mPa·s (25° C.) or less, a reduction in weight from 200° C. to 400° C. in a thermal weight measurement when the temperature of the CNT agglomerate extracted from the CNT dispersion is increased at 1° C. per minute is 10% or less, a pore diameter of the CNT agglomerate extracted from the CNT dispersion measured using a mercury intrusion porosimeter is distributed in a first range of 0.002 µm or more and 10.00 µm or less, the CNT agglomerate has a pore volume based on the pore diameter and a differential pore volume corresponding to the pore volume, the differential pore volume is at a maximum where the pore diameter is in a second range of 0.02 µm or more and 2.0 µm or less, and the pore volume where the pore diameter is in the second range is 0.5 mL/g or more.

8. The CNT dispersion according to claim 7, wherein an average distribution size of the CNT agglomerate extracted from the CNT dispersion is 500 µm$^2$ or more and 50000 µm$^2$ or less.

9. A CNT dispersion comprising a dispersion medium and a plurality of CNT agglomerates dispersed in the dispersion medium, wherein a concentration of the CNT agglomerates dispersed in the dispersion medium is 0.001% by weight or more with respect to the total CNT dispersion, a CNT agglomerate extracted from the CNT dispersion has a specific surface area of 800 m$^2$/g or more and 2600 m$^2$/g or less, the CNT agglomerate extracted from the CNT dispersion comprises a CNT network with a mesh structure, the mesh structure comprises a trunk section, the CNT network comprises a plurality of pores to impregnate the dispersion medium, and viscosity of the CNT dispersion at a shear rate of 10/seconds is 10 mPa·s (25° C.) or more and 5000 mPa·s (25° C.) or less, a pore diameter of the CNT agglomerate extracted from the CNT dispersion measured using a mercury intrusion porosimeter is distributed in a first range of 0.002 µm or more and 10.00 µm or less, the CNT agglomerate has a pore volume based on the pore diameter and a differential pore volume corresponding to the pore volume, the differential pore volume is at a maximum where the pore diameter is in a second range of 0.02 µm or more and 2.0 µm or less, and the pore volume where the pore diameter is in the second range is 0.5 mL/g or more.

10. The CNT dispersion according to claim 9, wherein an average distribution size of the CNT agglomerate extracted from the CNT dispersion is 500 µm$^2$ or more and 50000 µm$^2$ or less.

* * * * *